United States Patent
Youssef

(10) Patent No.: US 11,824,990 B2
(45) Date of Patent: Nov. 21, 2023

(54) SYSTEMS AND METHODS PROVIDING SPECIALIZED PROOF OF CONFIDENTIAL KNOWLEDGE

(71) Applicant: Dapper Labs, Inc., Vancouver (CA)

(72) Inventor: Tarek Ben Youssef, Vancouver (CA)

(73) Assignee: Dapper Labs, Inc., Vancouver (CA)

( * ) Notice: Subject to any disclaimer, the term of this patent is extended or adjusted under 35 U.S.C. 154(b) by 0 days.

(21) Appl. No.: 17/745,874

(22) Filed: May 17, 2022

(65) Prior Publication Data

US 2022/0278844 A1 Sep. 1, 2022

Related U.S. Application Data

(63) Continuation of application No. 17/389,905, filed on Jul. 30, 2021, now Pat. No. 11,394,550.

(60) Provisional application No. 63/058,918, filed on Jul. 30, 2020.

(51) Int. Cl.
*H04L 9/32* (2006.01)
*H04L 9/30* (2006.01)
*H04L 9/00* (2022.01)

(52) U.S. Cl.
CPC .............. *H04L 9/3218* (2013.01); *H04L 9/30* (2013.01); *H04L 9/3252* (2013.01); *H04L 9/50* (2022.05)

(58) Field of Classification Search
CPC ....... H04L 9/3252; H04L 9/3218; H04L 9/30; H04L 9/50
See application file for complete search history.

(56) References Cited

U.S. PATENT DOCUMENTS

| | | | |
|---|---|---|---|
| 10,735,205 B1* | 8/2020 | Wentz | H04L 9/3257 |
| 11,012,242 B1* | 5/2021 | Griffin | H04L 9/3297 |
| 11,062,280 B1* | 7/2021 | Blankstein | G06F 11/184 |

(Continued)

FOREIGN PATENT DOCUMENTS

| CN | 110198213 A | 9/2019 |
|---|---|---|
| CN | 110999206 A | 4/2020 |

(Continued)

OTHER PUBLICATIONS

"U.S. Appl. No. 17/389,905, 312 Amendment filed May 19, 2022", 8 pgs.

(Continued)

*Primary Examiner* — Gary S Gracia
(74) *Attorney, Agent, or Firm* — Schwegman Lundberg & Woessner, P.A.

(57) ABSTRACT

Systems and methods for verifying proofs generated from shared data without revealing the shared data are provided. In one aspect, a method comprises receiving, from a first node, a first proof generated from a first private key associated with the first node and data shared between the first node and a second node; receiving, from the second node, a second proof generated from a second private key associated with the second node and the shared data; verifying, without revealing the shared data, the first proof and the second proof were both generated from the shared data with a first public key mathematically related to the first private key, and a second public key mathematically related to the second private key; and preforming an action based on the verification of the first proof and the second proof both being generated from the shared data.

20 Claims, 10 Drawing Sheets

(56) References Cited

U.S. PATENT DOCUMENTS

| | | | | |
|---|---|---|---|---|
| 11,157,899 | B1* | 10/2021 | Nelson | G06F 9/4401 |
| 11,290,280 | B1* | 3/2022 | Nelson | H04L 9/3239 |
| 11,394,550 | B2* | 7/2022 | Youssef | H04L 9/3247 |
| 2007/0071243 | A1* | 3/2007 | Nanda | H04L 9/3218 380/277 |
| 2010/0070805 | A1* | 3/2010 | Chang | G06F 11/3688 714/39 |
| 2017/0257358 | A1* | 9/2017 | Ebrahimi | H04L 9/3236 |
| 2019/0044734 | A1* | 2/2019 | Lancashire | H04L 9/3247 |
| 2019/0121847 | A1* | 4/2019 | Castañeda-Villagrán | G06N 20/00 |
| 2019/0147532 | A1* | 5/2019 | Singh | H04L 9/3239 705/35 |
| 2019/0163672 | A1* | 5/2019 | Shmueli | G06F 16/1824 |
| 2019/0163887 | A1* | 5/2019 | Frederick | H04L 9/3236 |
| 2019/0164150 | A1* | 5/2019 | Lee | G06Q 20/363 |
| 2019/0165930 | A1* | 5/2019 | Castinado | H04L 9/3239 |
| 2019/0166133 | A1* | 5/2019 | Frederick | H04L 9/3239 |
| 2019/0180276 | A1* | 6/2019 | Lee | H04L 9/3247 |
| 2019/0182257 | A1* | 6/2019 | Lee | G06Q 10/06315 |
| 2019/0207750 | A1* | 7/2019 | Harvey | H04L 9/0643 |
| 2019/0207751 | A1* | 7/2019 | Harvey | H04L 9/3239 |
| 2019/0215149 | A1* | 7/2019 | Ramasamy | G06N 3/02 |
| 2019/0220859 | A1* | 7/2019 | Weight | H04L 9/14 |
| 2019/0251552 | A1* | 8/2019 | Kurian | H04L 9/3247 |
| 2019/0268139 | A1* | 8/2019 | Kurian | H04L 9/0637 |
| 2019/0268153 | A1* | 8/2019 | Kurian | H04L 9/3239 |
| 2019/0288854 | A1* | 9/2019 | Xie | H04L 9/0891 |
| 2019/0296915 | A1* | 9/2019 | Lancashire | H04L 9/3247 |
| 2019/0303939 | A1* | 10/2019 | Kurian | G06Q 20/36 |
| 2019/0304038 | A1* | 10/2019 | Purushothaman | G06Q 50/163 |
| 2019/0306230 | A1* | 10/2019 | Purushothaman | H04L 67/125 |
| 2019/0333030 | A1* | 10/2019 | Ramasamy | G06Q 20/3674 |
| 2020/0136815 | A1* | 4/2020 | Trevethan | H04L 9/08 |
| 2020/0184041 | A1* | 6/2020 | Andon | A63F 13/60 |
| 2020/0184469 | A1* | 6/2020 | Austin | G06Q 20/40 |
| 2020/0204581 | A1* | 6/2020 | Manadhata | H04L 61/4511 |
| 2020/0320527 | A1* | 10/2020 | Zhuang | H04L 9/30 |
| 2020/0389313 | A1* | 12/2020 | Singh | H04L 9/3239 |
| 2021/0111880 | A1* | 4/2021 | Ren | G06F 21/62 |
| 2021/0160074 | A1* | 5/2021 | Kumaresan | H04L 9/3218 |
| 2021/0271667 | A1* | 9/2021 | Cohen | H04L 9/3247 |
| 2021/0288808 | A1* | 9/2021 | Bahety | H04L 9/3213 |
| 2022/0038285 | A1* | 2/2022 | Youssef | H04L 9/3218 |

FOREIGN PATENT DOCUMENTS

| | | |
|---|---|---|
| CN | 115152177 | 10/2022 |
| JP | 2016180840 | 10/2016 |
| JP | 2017118447 | 6/2017 |
| WO | WO-2022023816 A1 | 2/2022 |

OTHER PUBLICATIONS

"U.S. Appl. No. 17/389,905, PTO Response to Rule 312 Communication dated May 27, 2022", 2 pgs.

"Australian Application Serial No. 2021316961, First Examination Report dated Jul. 29, 2022", 3 pgs.

"European Application Serial No. 21850707.7, Response to Communication pursuant to Rules 161(2) and 162 EPC filed Aug. 31, 2022", 19 pgs.

U.S. Appl. No. 17/389,905, Non Final Office Action dated Nov. 3, 2021, 24 pgs.

U.S. Appl. No. 17/389,905, Response filed Feb. 2, 2022 to Non Final Office Action dated Nov. 3, 2021, 24 pgs.

U.S. Appl. No. 17/389,905, Notice of Allowance dated Mar. 3, 2022, 21 pgs.

International Application Serial No. PCT/IB2021/000518, International Search Report dated Nov. 24, 2021, 2 pgs.

International Application Serial No. PCT/IB2021/000518, Written Opinion dated Nov. 24, 2021, 6 pgs.

Felten, "How Not to Solve the Verifiers' Dilemma", Offchain Labs, [online] [retrieved on Mar. 3, 2022]. Retrieved from the Internet: <https://medium.com/offchainlabs/how-not-to-solve-the-verifiers-dilemma-e5fblaf49661>, (Sep. 13, 2019).

Hentschel, et al., "Flow: Separating Consensus and Compute-Execution Verification", Flow, [Online] [retrieved on Nov. 23, 2021 (Nov. 23, 2021)]. Retrieved from the Internet: <https://arxiv.org/pdf/1909.05832.pdf>, (Sep. 12, 2019), 1-35.

Hentschel, Dr. Alexander, et al., "Flow: Separating Consensus and Compute-Block Formation and Execution", Flow, ArXiv abs/2002.07403v1, Retrieved from the Internet: <https://arxiv.org/pdf/2002.07403.pdf>, (Feb. 18, 2020), 41 pgs.

"Korean Application Serial No. 10-2022-7020662, Notice of Preliminary Rejection dated Oct. 19, 2022", With English translation, 5 pgs.

"Korean Application Serial No. 10-2022-7020662, Response filed Dec. 16, 22 to Notice of Preliminary Rejection dated Oct. 19, 2022", With English machine translation, 20 pgs.

"Japanese Application Serial No. 2022-544416, Notification of Reasons for Rejection dated Jan. 4, 2023", With English machine translation, 6 pgs.

Boneh, Dan, "Short Signatures from the Weil Pairing", Journal of Cryptology, Springer, vol. 17, (Jul. 30, 2004), 297-319.

Australian Application Serial No. 2021316961, Response filed Mar. 16, 23 First Examination Report dated Jul. 29, 2022, 205 pgs.

International Application Serial No. PCT/IB2021/000518, International Preliminary Report on Patentability dated Feb. 9, 2023, 6 pgs.

Japanese Application Serial No. 2022-544416, Response filed Feb. 9, 2023 to Notification of Reasons for Rejection dated Jan. 4, 2023, w/ English claims, 16 pgs.

Korean Application Serial No. 10-2022-7020662, Notice of Preliminary Rejection dated Feb. 21, 2023, w/ English Translation, 5 pgs.

Korean Application Serial No. 10-2022-7020662, Response filed Apr. 6, 2023 Notice of Preliminary Rejection dated Feb. 21, 2023, w/ English claims, 10 pgs.

Chinese Application Serial No. 202180009307.6, Office Action dated Jun. 8, 2023, w/ English Translation, 10 pgs.

* cited by examiner

900

Receive a Proofs Each Generated from a Respective Private Key
902

Verify the Proofs Were Generated from Shared Data Without Revealing the Shared Data
904

Preform an Action Based on the Verification
906

SYSTEMS AND METHODS PROVIDING SPECIALIZED PROOF OF CONFIDENTIAL KNOWLEDGE

CROSS REFERENCE TO RELATED APPLICATIONS

This application is a continuation of and claims the benefit of priority under 35 U.S.C. § 120 to U.S. patent application Ser. No. 17/389,905, filed on Jul. 30, 2021, which claims priority to U.S. Patent Application No. 63/058,918 filed on Jul. 30, 2020, each of which is herein incorporated by reference for all purposes.

TECHNICAL FIELD

The disclosed technology relates generally to a systems and methods for providing enhanced data verification and cryptographic signatures.

BACKGROUND

In a classical cryptographic signature scheme, the private key is the only secret data handled by the signer. The corresponding public key is a publicly known data. For example, the signing entity may store their private key and share the corresponding public key with any other party.

The message being signed is public data and is required by whoever is verifying the signature, just like the public key corresponding to the signer's private key.

The verifier entity may verify the message, public key, and digital signature correspond with each other. The verification process either accepts (e.g., output "success," etc.) or rejects (e.g., output "fail," etc.) the three data consistency (i.e. that the message, public key, and digital signature correspond with each other). If the verification process outputs "success," a third party is convinced with high probability that the message has been signed by the holder of the secret private key. There is an assumption that it is computationally infeasible to generate a valid digital signature by the signing entity without knowing that entity's private key. The verifier may depend on the assumption that identity of the signing entity is achieved by the entity possessing the private key. In some examples, the verifier can provide goods or services to the signing entity under the assumption of their digitally determined identity. In some examples, the verifier can perform other activities in response to the verified information, depending on the application where the signature was used (e.g., approve the contract/agreement/action on the signed document, etc.).

BRIEF SUMMARY OF EMBODIMENTS

The systems described herein employ a Specialized Proof of Confidential Knowledge (SPoCK) scheme. This scheme presents a scenario where a private key is still secret, but the message is secret too. The scheme can be employed by provers within the described systems to generate a proof using these two secret data. In some embodiments, the scheme allows two or more parties to provide public proof to show that they know the same secret (e.g., the secret message). In some embodiments, the process of generating a proof and verifying two or more proofs is non-interactive. In some embodiments, every proof is specialized to a prover as it is generated using the prover's private key. In some embodiments, the proof can be publicly revealed by a prover while keeping the secret message secret.

Proofs may be specialized or non-specialized. A proof is "specialized" if it can only be attributed to one prover user. A "specialized" proof may be generated by using data owned only by the prover user (e.g., a private key). A "non-specialized" proof is a proof that cannot be attributed to a specific prover user and be claimed to be generated by any prover user.

In an illustrative example, two prover users, A and B, both know a secret and want to prove it to a verifier user or even publicly. The prover users cannot reveal the secret publicly (otherwise it is no longer a secret) and cannot share a non-specialized proof of the secret. For instance, hashing the secret and sharing the hash publicly protects the secret, but any party can copy the hash and claim they know the secret too. In some embodiments of the disclosure, the proof may be generated so that the device that generated the proof is only attributable to its prover user. The scheme may work with two prover users, but it can be generalized to any number of prover users to show they all know the same secret.

As an example, in some embodiments, a prover user may generate a proof (e.g., a specialized proof of confidential knowledge) using a secret message and the device's private key. The generated proof cannot be verified on its own by a verifier using only one prover user's corresponding public key. This is because the message is secret and is not known by the verifier. However, if a second party (a second prover user), holding a second private key, also generates a proof (e.g., a specialized proof of confidential knowledge) using the same secret message and this second private key, then the verifier, using the two public keys of the prover users, can determine whether both proofs have been generated from the same secret message. In such embodiments, the verifier will not have access to the contents of the secret message, but if the verification process outputs "success," then the verifier can determine whether both prover users have used the same secret message.

Accordingly, in one aspect, described herein are computer-implemented methods for verifying proofs generated from shared data without revealing the shared data. The methods are executed by one or more processors. The methods comprise: receiving, from a first node, a first proof generated from a first private key associated with the first node and data shared between the first node and a second node; receiving, from the second node, a second proof generated from the shared data and a second private key associated with the second node; verifying, without revealing the shared data, the first proof and the second proof were both generated from the shared data with a first public key mathematically related to the first private key, and a second public key mathematically related to the second private key; and preforming an action based on the verification of the first proof and the second proof both being generated from the shared data. In some embodiments, the first proof and the second proof are publicly revealed by the first node and the second node respectively. In some embodiments, the action comprises revealing publicly the verification of the first proof and the second proof were both generated from the shared data. In some embodiments, the first proof is only attributable to the first node. In some embodiments, the second proof is only attributable to the second node. In some embodiments, the first proof or the second proof cannot be verified with only the respective public key. In some embodiments, the first proof and the second proof each comprise a signature of the shared data generated with the respective private key. In some embodiments, the signatures are based on a BLS signature scheme. In some embodiments, the verification of the first proof and the second proof comprises a pairing equality check based on the two signatures, the first public key, and the second public key. In some embodiments, verifying the first proof and the second proof comprises a pairing equality check. In some embodiments, the first proof and the second proof are generated and verified in a non-interactive protocol. In some embodiments, the shared data comprises an execution trace proving an execution of at least one transaction of a block within a blockchain. In some embodiments, the first node comprises a verification node employed to guarantee correctness of a computation of an execution node. In some embodiments, the computation comprises the execution trace. In some embodiments, the second node comprises the execution node employed to execute the at least one transaction of the block. In some embodiments, the verification node publishes the first proof as proof that the computation has been verified. In some embodiments, the action comprises providing a state response to a client, the state response determined based on an output for the block. In some embodiments, the computation is broken up into chunks to allow a lighter computation verification in a parallel and independent manner. In some embodiments, the action comprises arbitrating that each of the chunks are consistently generated from the same intermediate results by the execution node and the verification node.

In another aspect, described herein are systems for verifying proofs generated from shared data without revealing the shared data. These systems comprise: one or more processors; and a computer-readable storage device coupled to the one or more processors and having instructions stored thereon which, when executed by the one or more processors, cause the one or more processors to perform operations. These operations comprise: receiving, from a first node, a first proof generated from a first private key associated with the first node and data shared between the first node and a second node; receiving, from the second node, a second proof generated from the shared data and a second private key associated with the second node; verifying, without revealing the shared data, the first proof and the second proof were both generated from the shared data with a first public key mathematically related to the first private key, and a second public key mathematically related to the second private key; and preforming an action based on the verification of the first proof and the second proof both being generated from the shared data. In some embodiments, the first proof and the second proof are publicly revealed by the first node and the second node respectively. In some embodiments, the action comprises revealing publicly the verification of the first proof and the second proof were both generated from the shared data. In some embodiments, the first proof is only attributable to the first node. In some embodiments, the second proof is only attributable to the second node. In some embodiments, the first proof or the second proof cannot be verified with only the respective public key. In some embodiments, the first proof and the second proof each comprise a signature of the shared data generated with the respective private key. In some embodiments, the signatures are based on a BLS signature scheme. In some embodiments, the verification of the first proof and the second proof comprises a pairing equality check based on the two signatures, the first public key, and the second public key. In some embodiments, verifying the first proof and the second proof comprises a pairing equality check. In some embodiments, the first proof and the second proof are generated and verified in a non-interactive protocol. In some embodiments, the shared data comprises an execution trace proving an execution of at least one transaction of a block within a blockchain. In some embodiments, the first node comprises a verification node employed to guarantee correctness of a computation of an execution node. In some embodiments, the computation comprises the execution trace. In some embodiments, the second node comprises the execution node employed to execute the at least one transaction of the block. In some embodiments, the verification node publishes the first proof as proof that the computation has been verified. In some embodiments, the action comprises providing a state response to a client, the state response determined based on an output for the block. In some embodiments, the computation is broken up into chunks to allow a lighter computation verification in a parallel and independent manner. In some embodiments, the action comprises arbitrating that each of the chunks are consistently generated from the same intermediate results by the execution node and the verification node.

In another aspect, described herein are non-transitory computer-readable storage media coupled to one or more processors and having instructions stored thereon which, when executed by the one or more processors, cause the one or more processors to perform operations. These operations comprise: receiving, from a first node, a first proof generated from a first private key associated with the first node and data shared between the first node and a second node; receiving, from the second node, a second proof generated from the shared data and a second private key associated with the second node; verifying, without revealing the shared data, the first proof and the second proof were both generated from the shared data with a first public key mathematically related to the first private key, and a second public key mathematically related to the second private key; and preforming an action based on the verification of the first proof and the second proof both being generated from the shared data. In some embodiments, the first proof and the second proof are publicly revealed by the first node and the second node respectively. In some embodiments, the action comprises revealing publicly the verification of the first proof and the second proof were both generated from the shared data. In some embodiments, the first proof is only attributable to the first node. In some embodiments, the second proof is only attributable to the second node. In some embodiments, the first proof or the second proof cannot be verified with only the respective public key. In some embodiments, the first proof and the second proof each comprise a signature of the shared data generated with the respective private key. In some embodiments, the signatures are based on a BLS signature scheme. In some embodiments, the verification of the first proof and the second proof comprises a pairing equality check based on the two signatures, the first public key, and the second public key. In some embodiments, verifying the first proof and the second proof comprises a pairing equality check. In some embodiments, the first proof and the second proof are generated and verified in a non-interactive protocol. In some embodiments, the shared data comprises an execution trace proving an execution of at least one transaction of a block within a blockchain. In some embodiments, the first node comprises a verification node employed to guarantee correctness of a computation of an execution node. In some embodiments, the computation comprises the execution trace. In some embodiments, the second node comprises the execution node employed to execute the at least one transaction of the block. In some embodiments, the verification node publishes the first proof as proof that the computation has been verified. In some embodiments, the action comprises providing a state response to a client, the state response determined based on an output for the block. In some embodiments, the computation is broken up into chunks to allow a lighter computation verification in a parallel and independent manner. In some embodiments, the action comprises arbitrating that each of the chunks are consistently generated from the same intermediate results by the execution node and the verification node.

In another aspect, described herein are systems for verifying proofs generated from shared data without revealing the shared data. These systems comprise: one or more processors; and a computer-readable storage device coupled to the one or more processors and having instructions stored thereon which, when executed by the one or more processors, cause the one or more processors to perform operations. These operations comprise: receiving, from each of a plurality of nodes, a respective proof generated from data shared between the nodes and a respective private key associated with each node; verifying, without revealing the shared data, each of the proofs were generated from the shared data with a plurality of public keys each mathematically related to a respective one of the private keys; and preforming an action based on the verification of the proofs being generated from the shared data. In some embodiments, each of the proofs are publicly revealed by their respective nodes. In some embodiments, the action comprises revealing publicly the verification of the first proof and the second proof were both generated from the shared data. In some embodiments, each of the proofs is only attributable to the respective generating node. In some embodiments, each of the proofs cannot be verified with only the respective public key. In some embodiments, proofs each comprise a signature of the shared data generated with the respective private key. In some embodiments, the verification of the proofs comprises a pairing equality check based on the signatures and the public keys. In some embodiments, verifying the proofs comprises a pairing equality check. In some embodiments, the proofs are generated and verified in a non-interactive protocol. In some embodiments, the shared data comprises an execution trace proving an execution of at least one transaction of a block within a blockchain.

In another aspect, described herein are computer-implemented methods for verifying proofs generated from shared data without revealing the shared data. The methods are executed by one or more processors. The methods comprise: receiving, from each of a plurality of nodes, a respective proof generated from data shared between the nodes and a respective private key associated with each node; verifying, without revealing the shared data, each of the proofs were generated from the shared data with a plurality of public keys each mathematically related to a respective one of the private keys; and preforming an action based on the verification of the proofs being generated from the shared data. In some embodiments, each of the proofs are publicly revealed by their respective nodes. In some embodiments, the action comprises revealing publicly the verification of the first proof and the second proof were both generated from the shared data. In some embodiments, each of the proofs is only attributable to the respective generating node. In some embodiments, each of the proofs cannot be verified with only the respective public key. In some embodiments, proofs each comprise a signature of the shared data generated with the respective private key. In some embodiments, the verification of the proofs comprises a pairing equality check based on the signatures and the public keys. In some embodiments, verifying the proofs comprises a pairing equality check. In some embodiments, the proofs are generated and verified in a non-interactive protocol. In some embodiments, the shared data comprises an execution trace proving an execution of at least one transaction of a block within a blockchain.

In another aspect, described herein are non-transitory computer-readable storage media coupled to one or more processors and having instructions stored thereon which, when executed by the one or more processors, cause the one or more processors to perform operations. These operations comprise: receiving, from each of a plurality of nodes, a respective proof generated from data shared between the nodes and a respective private key associated with each node; verifying, without revealing the shared data, each of the proofs were generated from the shared data with a plurality of public keys each mathematically related to a respective one of the private keys; and preforming an action based on the verification of the proofs being generated from the shared data. In some embodiments, each of the proofs are publicly revealed by their respective nodes. In some embodiments, the action comprises revealing publicly the verification of the first proof and the second proof were both generated from the shared data. In some embodiments, each of the proofs is only attributable to the respective generating node. In some embodiments, each of the proofs cannot be verified with only the respective public key. In some embodiments, proofs each comprise a signature of the shared data generated with the respective private key. In some embodiments, the verification of the proofs comprises a pairing equality check based on the signatures and the public keys. In some embodiments, verifying the proofs comprises a pairing equality check. In some embodiments, the proofs are generated and verified in a non-interactive protocol. In some embodiments, the shared data comprises an execution trace proving an execution of at least one transaction of a block within a blockchain. In some embodiments, a number of verifications of the proofs is linear in the number of the nodes and not quadratic. In some embodiments, verifying the proofs requires one less verification than the number of nodes.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting the breadth, scope, or applicability thereof. It should be noted that for clarity and ease of illustration these drawings are not necessarily made to scale.

Figure 1:
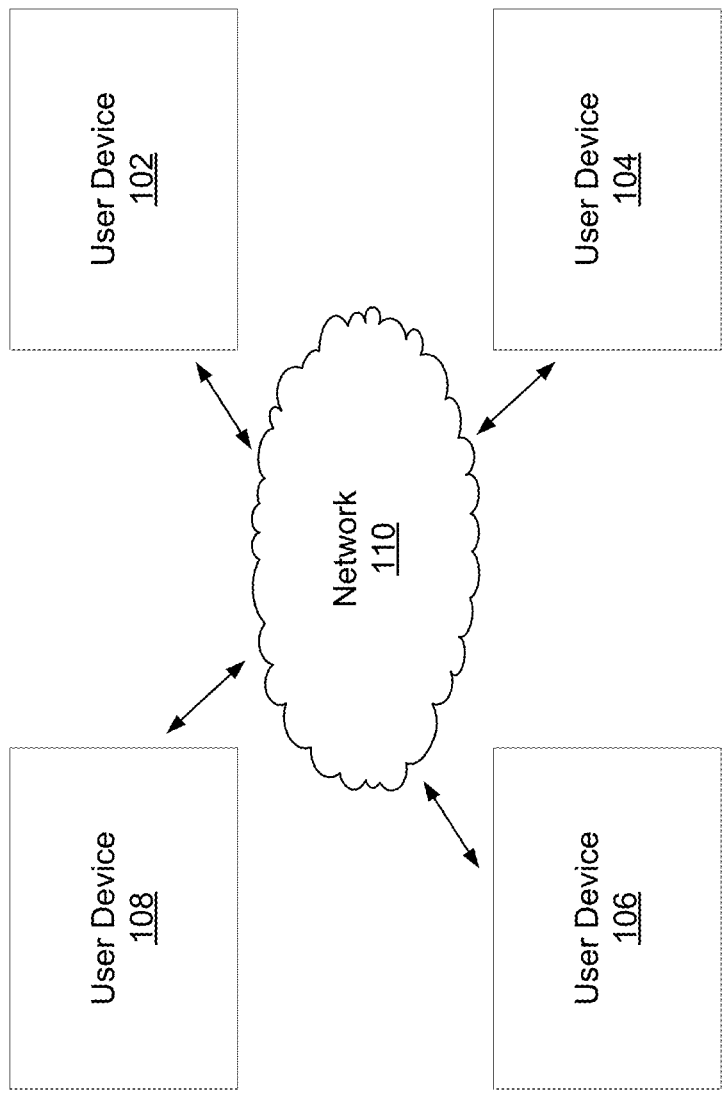
FIG. 1 illustrates a distributed ledger and/or blockchain system, as illustrated in various embodiments of the disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, the term "smart contract" refers to a set of computer-implemented instructions that can automatically execute, control or document computational events and actions in a digitized environment. In some examples, the computations may be performed on a blockchain or distributed ledger of computational devices. The implementation of the smart contract may be deployed using cryptographically signed transactions on the blockchain network. In some examples, a smart contract implements a set of computer-implemented instructions related to rules and penalties of an agreement. A smart contract may accomplish this by taking information as input, assigning a value to that input through the rules set out in the smart contract, and self-executing the computer-implemented actions required by those rules. For example, a smart contract may determine whether an asset should be sent to a destination entity or whether it should be returned to an originating entity.

As an illustrative example, a smart contract may be programed to deliver payment when an item is received. In this format, a smart contract may be generated as computer code, stored and replicated on the system (e.g., in a blockchain or distributed ledger, etc.), and supervised by a network of computers that run the blockchain. Smart contracts can store data. The data stored can be used to record information, fact, associations, balances and any other information needed to implement logic for real world contracts. In some embodiments, a smart contract is deployed, stored, and executed within a virtual machine.

As used herein, the term "composability" includes a system design principle that deals with the inter-relationships of components. For example, a highly composable system provides components that can be selected and assembled in various combinations to satisfy specific user requirements. In the context of blockchain and smart contracts, composability includes the ability to chain together operations involving multiple independent smart contracts. A recent example of composability is dY/dX, which is a decentralized protocol for financial derivatives built on the Ethereum blockchain. dY/dX allows for decentralized margin trading by enabling collateralized loans. A typical dY/dX transaction combines at least three separate smart contracts: The core dY/dX contract itself, a decentralized exchange like 0x, and at least one Ethereum Request for Comment (ERC)-20 token such as DAI.

As used herein, the term "sharding" generally refer to a variety of scaling proposals that divide the network into a series of subunits which interact asynchronously. The concept has been widely used in databases, to make them more scalable. More recently, sharding has been employed for blockchain to improve transaction speed in the blockchain. In a database context, for example, sharding may include a method for horizontally partitioning data within a database. More generally, the database is broken into little pieces called "shards," that when aggregated together form the original database. In distributed blockchain networks, the network consists of a series of nodes connected in a peer to peer format, with no central authority. In some examples, of blockchain systems, each node stores all states of the network and processes all of the transactions. While this provides the high level security through decentralization, especially in Proof of Work (PoW) systems such as Bitcoin and Ethereum®, it can lead to legitimate scaling problems. For example, a full node in the Ethereum network stores the entire state of the blockchain, including account balances, storage, and contract code. Unfortunately, as the number of participants increases linearly, the inter-communication overhead between them increases at an exponential pace. This limitation is due to the communication needed between the nodes needed to reach consensus. Nodes in the network do not have special privileges and every node in the network stores and processes every transaction. As a result, in a network the size of Ethereum's, issues such as high gas costs and longer transaction confirmation times become noticeable problems when the network is strained. The network is only as fast as the individual nodes rather than the sum of its parts. As such, sharding helps to alleviate these issues. The concept involves grouping subsets of nodes into shards that in turn process transactions specific to that shard. Employment of this type of architecture allows a system to process many transactions in parallel.

As used herein, the term "consensus algorithm" or "consensus protocol" includes a set of rules that describe how the communication and transmission of data between electronic devices, such as nodes, works. Consensus is achieved when enough devices are in agreement about what is true and what should be recorded onto a blockchain. Therefore, consensus protocols are the governing rules that allow devices that are scattered across the world to factually come to an agreement, allowing a blockchain network to function without being corrupted.

As used herein, the term "Byzantine fault tolerance (BFT) consensus algorithm," in context of distributed systems, includes the ability of a distributed computer network, such as the peer to peer network of nodes in the described system, to function as desired and correctly reach a sufficient consensus despite malicious components (nodes) of the system failing or propagating incorrect information to other peers. The objective is to defend against catastrophic system failures by mitigating the influence these malicious nodes have on the correct function of the network and the right consensus that is reached by the honest nodes in the system.

As used herein, the term "slash," is to punish, for example, a network participant, for failing to follow the rules set out for the network. Punishment may be in the form of a fine applied to funds they have put in escrow or staked.

As used herein, the term "interactive protocol" among parties (e.g., nodes) includes a constraint that the parties exchange messages in a kind of dialogue (e.g., via questions and answers). In some embodiments, this exchange of messages requires some form of synchronization in order to send and receive the messages.

As used herein, the term "non-interactive protocol" among parties (e.g., nodes) allows each of the parties to perform actions without waiting for the others. In some embodiments of the described system, a node generates a proof on its own and does not require input from any of the other nodes. Similarly, in some embodiments of the described system, verification does not require further discussion with the users as only their initial proof is enough.

FIG. 1 illustrates a distributed ledger and/or blockchain system, as illustrated in various embodiments of the disclosure. The distributed ledger may comprise one or more computing devices 102, 104, 106, 108, and a network 110, which may be used to form a peer-to-peer network. In some embodiments, the network 110 includes a local area network (LAN), wide area network (WAN), the Internet, or a combination thereof, and connects devices (e.g., the computing devices 102, 104, 106, 108). In some embodiments, the network 110 includes an intranet, an extranet, or an intranet or extranet that is in communication with the Internet. In some embodiments, the network 110 includes a telecommunication or a data network. In some embodiments, the network 110 can be accessed over a wired or a wireless communications link.

A distributed ledger (e.g., a blockchain) can be described as a ledger of any transactions or contracts maintained in decentralized form across different locations and people, eliminating the need of a central authority to keep a check against manipulation. All the information on it is securely and accurately stored using cryptography and can be accessed using keys and cryptographic signatures. Once the information is stored, it becomes an immutable database, which the rules of the network govern. Distributed ledgers are inherently harder to attack than, for example, a centralized ledger because all the distributed copies need to be attacked simultaneously for an attack to be successful. Moreover, these records are resistant to malicious changes by a single party.

Efficiency is a multi-faceted pillar that addresses two substantial problems observed in the blockchain space. The first is Proof of Work (PoW), which is consistently criticized for its excessive use of power and inefficient resource allocation. PoW is rejected as an option for securing a system. The second issue is the significant amount of duplicate effort a blockchain requires to operate, even in a Proof of Stake (PoS) based system which still requires all the nodes to hold all the state even though they are not solving a PoW problem. In a traditional blockchain, for example, each node may perform every task associated with block production. This duplication is not only a chokepoint for scale, it is a poor allocation of resources that would be better served if applied to their respective strengths.

Furthermore, blockchain technology may create permissionless and autonomous software systems as the long-run value of an ecosystem of autonomous, interoperable software may indeed stand as the most compelling outcome of the decentralized revolution. The overwhelming majority of existing proposals for open, consumer-scale blockchain systems depend on some kind of sharding. While the various approaches to sharding may legitimately increase the number of transactions the network is able to handle, they may limit the capability of those transactions. In particular, each transaction is only able to read and modify information within its own shard. In some sharded blockchain implementations, communication with other shards must occur asynchronously and—without expensive and complicated locking operations—runs the risk of acting on stale information. Moreover, existing proposal for a sharded blockchain do not provide the ability for a single atomic transaction to interact with multiple shards. For example, a separate transaction may be issued on each shard, and if atomicity guarantees are required (for example, if there is some reciprocal exchange of value), there may be some kind of complex locking and commitment system built on top of the blockchain.

An example distributed ledger is the commonly known blockchain. Blockchain is referenced within the present disclosure for purposes of illustration. It is contemplated, however, that any appropriate distributed ledger can be used in implementations of the present disclosure. A blockchain is a continuously growing list of records or blocks that are linked and secured using cryptography. Each block within the blockchain may include transaction data provided from transactions that have been executed in one or more contexts, such as negotiable instrument transactions, digital currency transactions, and so forth. In some examples, a transaction includes an agreement between a buyer and seller, a supplier and a consumer, or a provider and a consumer that there would be exchange of assets, products or services in lieu of currency, crypto-currency or some other asset either in present or in future. In some examples, a single block may include transaction data provided from multiple transactions (e.g., multiple deposits of different checks by different people). A blockchain may grow as completed blocks are added with a new set of transactions thus forming a ledger of the transaction. Each block may include a hash pointer to a previous block and a timestamp along with the transaction data in a permanent manner.

In some embodiments, the transactions in a block of a blockchain are hashed and encoded into a Merkle tree (e.g., the transactions are leaf nodes of a Merkle tree). A Merkle tree (or hash-based tree) is a hash-based data structure that may be a generalization of a hash list. A Merkle tree includes a tree structure in which each leaf node is a result of a cryptographic hash function (CHF) applied to the transaction to generate a hash value or "hash" and each non-leaf node is labelled with the cryptographic hash of the labels of its child nodes. Example CHFs include the secure hash algorithm 256 (SHA-256), SHA-3, and message digest 5 (MD5), among others. In general, the CHF receives information as input, and provides a hash value as output. The hash value can be a predetermined length. For example, SHA-256 outputs a 256-bit (32-byte, 64-character) hash value. In some examples, the hash value is a one-way hash value, in that the hash value cannot be 'un-hashed' to determine what the input was. Additionally, a Merkle tree may be implemented as a k-ary tree, which is a rooted tree data structure in which each node has no more than k children. For example, a Merkle tree may be implemented as binary tree where each node may have 0, 1, or 2 children. The Merkle root (or root hash) of such a binary tree can be generated by repeatedly hashing each pair of nodes until only one hash is left. In some examples, when the number of transactions is odd, the last hash may be duplicated once to create an even number of leaf nodes. If a single detail in any of the transactions or the order of the transactions changes, so does the Merkle root. As such, the Merkle root summarizes all of the data in the related transactions and can be stored in a block to maintain the integrity of the data. Thus, the employment of a Merkle tree allows for a quick and simple test of whether a specific transaction is included in the set or not.

In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, entities may agree on which transactions have actually occurred, and in which order. For example, if two entities observe different transaction histories, they may be unable to come to the same conclusion regarding the validity of a transaction. The blockchain enables the entities to come to an agreement as to transactions that have already occurred, and in which order. In short, and as described in further detail below, a ledger of transactions is agreed to be based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

A typical peer-to-peer network may include so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions may include verifying digital signatures associated with respective transactions. For a block to be added to the blockchain, a miner must demonstrate a PoW before their provided block of transactions is accepted by the peer-to-peer network. A blockchain protocol includes a PoW scheme that is based on a CHF. In some embodiments, the blockchain protocol can require multiple pieces of information as input to the CHF. For example, the input to the CHF can include a reference to the previous (most recent) block in the blockchain, details of the transaction(s) that are to be included in the to be created block, and a nonce value.

Multiple nodes may compete to hash a set of transactions and provide the next block that is to be added to the blockchain. The blockchain protocol may provide a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In some blockchain-based platforms, for example, each block producing node may go through a number of steps to create a candidate block. For example, a number of transactions are selected from a publicly-shared pool of pending transactions. In some embodiments, the selected transactions are assigned in an order in, for example, a linear list. Typically, there is some mechanism to limit the maximum number of transactions that can be included. In many embodiments, however, there is no enforced minimum. Computations specified by the transactions are performed. In some embodiments, each computation has access to a global shared state, and can make certain changes to that shared state. Moreover, in some embodiments, the input of one transaction could depend on the output of another transaction. In such embodiments, it is important that these computations are strictly performed in order. The transactions may be combined with a snapshot of the final canonical state resulting from processing those transactions. The results are broadcast to the rest of the network. In some embodiments, the "snapshot" is a hash of the canonical state, and can be in the form of, for example, the root node of a Merkle tree.

In some embodiments, each node in the network that receives a candidate block verifies that the computations implied by the transaction list have been computed correctly. These nodes may repeat each of the computations in the order specified by the candidate block. The nodes then compare the snapshot of the final canonical state they have computed with the snapshot in the candidate block from the original node. If the snapshots match, the block may be considered a valid candidate.

In unspent transaction output (UTXO) blockchains, such as Bitcoin, only transactions that successfully transfer tokens can be included in a block. On the other hand, in state-model blockchains, like Ethereum, it may be valid (and even common) to include transactions that fail. In some embodiments, these transactions are included in the block, but do not modify the canonical state (aside from the payment of the transaction fees). Thus, a transaction that is "processed correctly" may not actually do what was intended by user initiating the transaction.

Once one or more valid candidate blocks are produced, the network may use some consensus mechanism for collectively agreeing on a single valid candidate. This is typically "proof-of-work" in current blockchains, but there are many proposals for future networks—or evolutions of existing networks—that use "proof-of-stake". The embodiments of the decentralized computation system, described herein, work equally well with either family of consensus mechanisms or when coupled with instant-finality, proof-of-stake consensus.

In some embodiments, an example system that can employ the described scheme provides an architectural approach with high throughput and no-sharding, which results in composability. In some embodiments, such composability provides for complex new trustless systems to be created through a novel combination of simpler trustless systems. The example decentralized computation system can be employed to, for example, support decentralized applications. In some embodiments, the example decentralized computation system divides a peer-to-peer network into three distinct node types, each responsible for one of three tasks: accessing the network from outside, securing the network from attacks, and computing the state of the network. Such separation of concerns enables node specialization, which dramatically improves the throughput of the network while enhancing the security and decentralization possibilities of the deployed system. Additionally, composability can be a powerful manifestation of software reuse, but composability without atomicity can lead to inconsistent results (e.g., "undesired states"). The example decentralized computation system may employ a scaling mechanism that allows each transaction the ability to atomically access and modify any part of the canonical state with which it is authorized to interact.

As described above, in some embodiments, the example decentralized computation system divides nodes in the network into three distinct roles: Access, Security, and Execution. This separation of concerns can enable high throughput without sacrificing synchrony, in an environment that maintains the access, security, reliability, and verifiability guarantees that characterize and uphold the integrity of a decentralized system. In some embodiments, the core relationship between the different node types is one of checks and balances, which ensures strong consensus on transaction inclusion, order, and output, and determines the canonical state of history. One of the challenges of this approach is coordinating three separate groups of nodes and ensuring efficient interactions between them.

In some embodiments, the example decentralized computation system provides the transaction capacity and computational throughput to support a thriving and engaging ecosystem that may be made available to mass market audiences (e.g., billions of active users). In some embodiments, the example decentralized computation system handles as many as one million transactions per second (TPS) or more.

The example decentralized computation system may not sacrifice practical utility. In particular, in some embodiments, the system preserves fully synchronous communication between smart contracts. Full synchrony ensures that inter-contract communications retain ACID guarantees for correctness (Atomicity, Consistency, Isolation, Durability), without complex locking schemes prone to error or exploitation. In short, synchrony may be required for one smart contract to be sure that another smart contract is executed correctly, and to allow independent smart contracts to be composed into complex systems without sacrificing safety.

Long-term, sustained decentralization may be one aspect provided by the example decentralized computation system. Many blockchain-enabled systems treat decentralization as optional or cosmetic, rather than a core value of the system. While this may result in some quick wins in the short term, those systems are likely to degrade over time. Moreover, without explicit incentives otherwise, valuable systems with any degree of centralization tend towards further centralization. The qualities of decentralization provided by the example decentralized computation system include: access, security, reliability, and verifiability.

In some embodiments, the example decentralized computation system provides access through the ability to use the system resources of the network at a fixed cost (provided a user is able to pay for their usage). Such access provides that there is no actor, or plausible group of actors, that can deny any class of users from using the network, or who can prioritize some traffic over others.

In some embodiments, the example decentralized computation system maintains security by ensuring that each honest participant in the network has the same view of history as other honest participants, and that this historical record cannot be modified after-the-fact.

Reliability includes the assurance that the rules of the system are applied uniformly, strictly enforced, and can change only in predictable, transparent ways. In some embodiments, the example decentralized computation system provides reliability by ensuring that there is no actor, or plausible cabal of actors, that can change these rules in a way without allowing users of the system to opt-out of those changes (through a hard fork, for example).

In some embodiments, the example decentralized computation system is verifiable in that it allows for transparency of some or all actions (e.g., the high-level on chain operations following the protocol rules, etc.). As such, anyone can confirm, using, for example, computer resources under their own control, that the protocol (and the rules defined within the protocol) has been followed correctly. This implicitly includes the ability to see all on-chain activity. For example, a user can verify a transaction they submitted was correctly executed on chain.

The example decentralized computation system guarantee of access, security, reliability, and verifiability, captures a much broader set of benefits from a decentralized environment. For example, guaranteeing access may help ensure anyone can join the network and easily understand the rules to which the network is bound. Moreover, a secure network may enact those rules without fail. This combination may produce an environment in which users can reason about the system and, with a known set of inputs, reliably predict and ultimately verify an outcome. Together, these requirements provide the robust criteria needed to achieve full decentralization and the associated benefits of transparency, autonomy, interoperability, and immutability.

Figure 2:
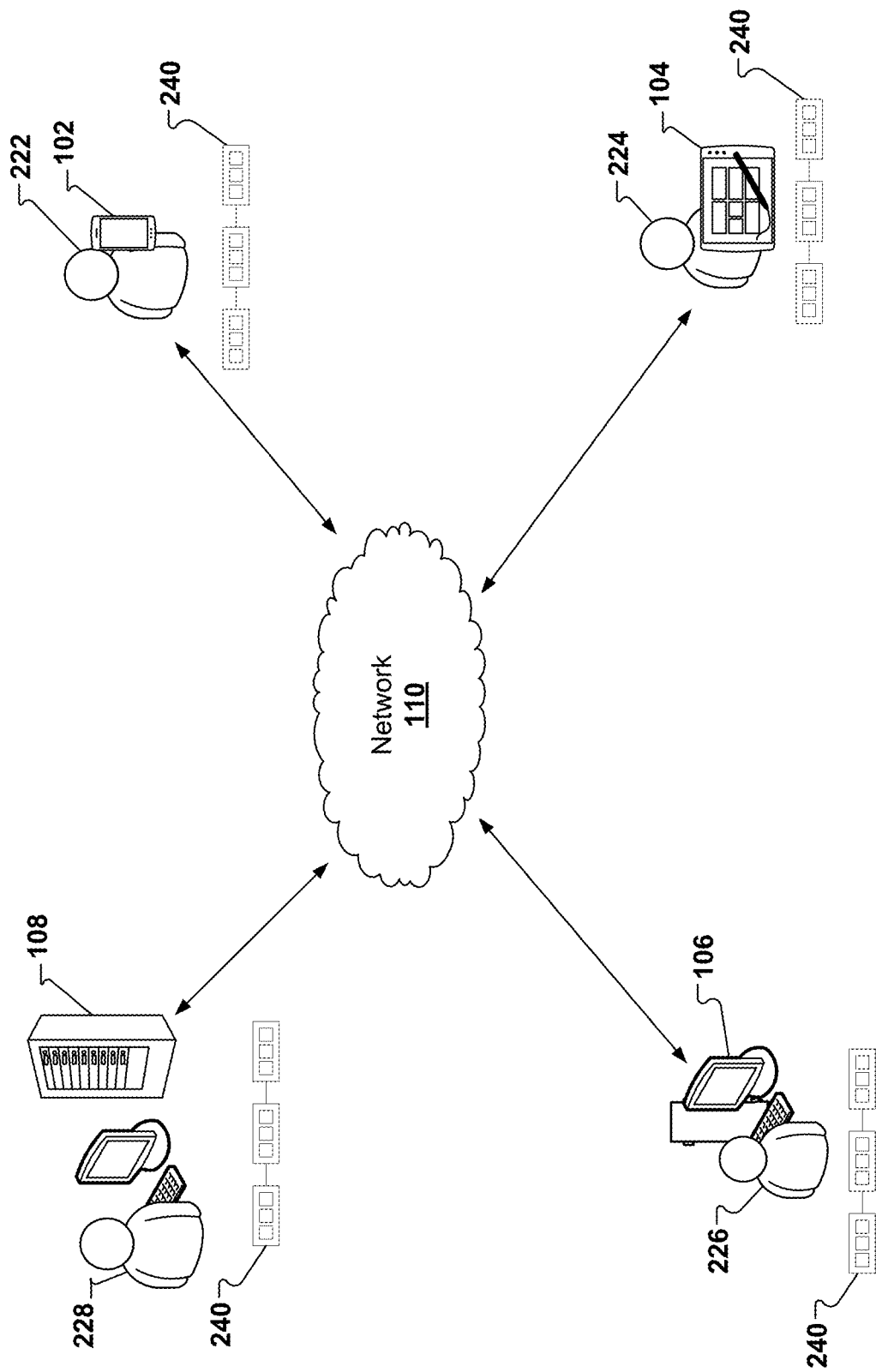
FIG. 2 depicts a non-limiting exemplary environment that can be employed to execute implementations of the present disclosure.

FIG. 2 depicts an example environment that can be employed to execute implementations of the present disclosure. The example system includes computing devices 102, 104, 106, 108, and a network 110, which may be used to form a peer-to-peer network. In some embodiments, the network 110 includes a local area network (LAN), wide area network (WAN), the Internet, or a combination thereof, and connects devices (e.g., the computing devices 102, 104, 106, 108). In some embodiments, the network 110 includes an intranet, an extranet, or an intranet or extranet that is in communication with the Internet. In some embodiments, the network 110 includes a telecommunication or a data network. In some embodiments, the network 110 can be accessed over a wired or a wireless communications link. For example, mobile computing devices (e.g., the smartphone device 102 and the tablet device 106), can use a cellular network to access the network 110.

In some examples, the users 122-128 may be working as user agents that employ agent software to interact with the decentralized computation system. For example, the users may employ their respective devices 102-108 to provide transaction or to function as nodes in the described system.

Figure 5:
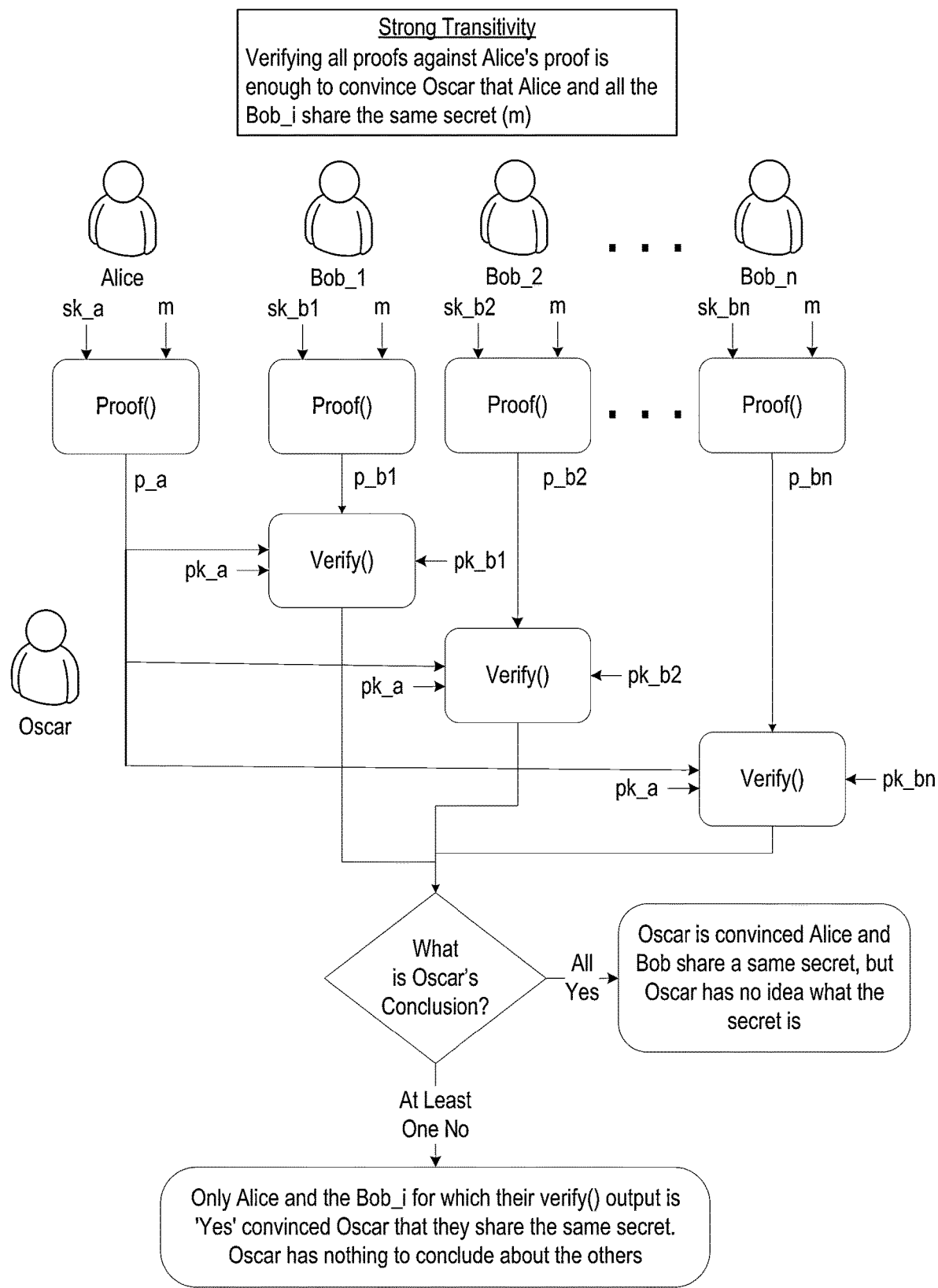

In some embodiments, the computing devices 102, 104, 106, and 108 are sustainably similar to computing device 510 depicted in FIG. 5. Four computing devices are depicted in FIG. 1-2 for simplicity. It is contemplated, however, that implementations of the present disclosure can be realized with any of the appropriate computing devices, such as those mentioned previously. Moreover, implementations of the present disclosure can employ any number of devices functioning as nodes in a peer-to-peer network as required.

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data computing devices. In the depicted example, the computing device 102 is a smartphone, the computing device 104 is a tablet-computing device, and the computing device 106 is a desktop computing device.

The server computing device 108 may include any appropriate type of computing device, such as described above for computing devices 102-106 as well as computing devices with server-class hardware. In some embodiments, the server computing device 108 may include computer systems using clustered computers and components to act as a single pool of seamless resources. For example, such implementations may be used in data center, and cloud computing. In some embodiments, back-end system 130 is deployed using a virtual machine(s).

Figure 3:
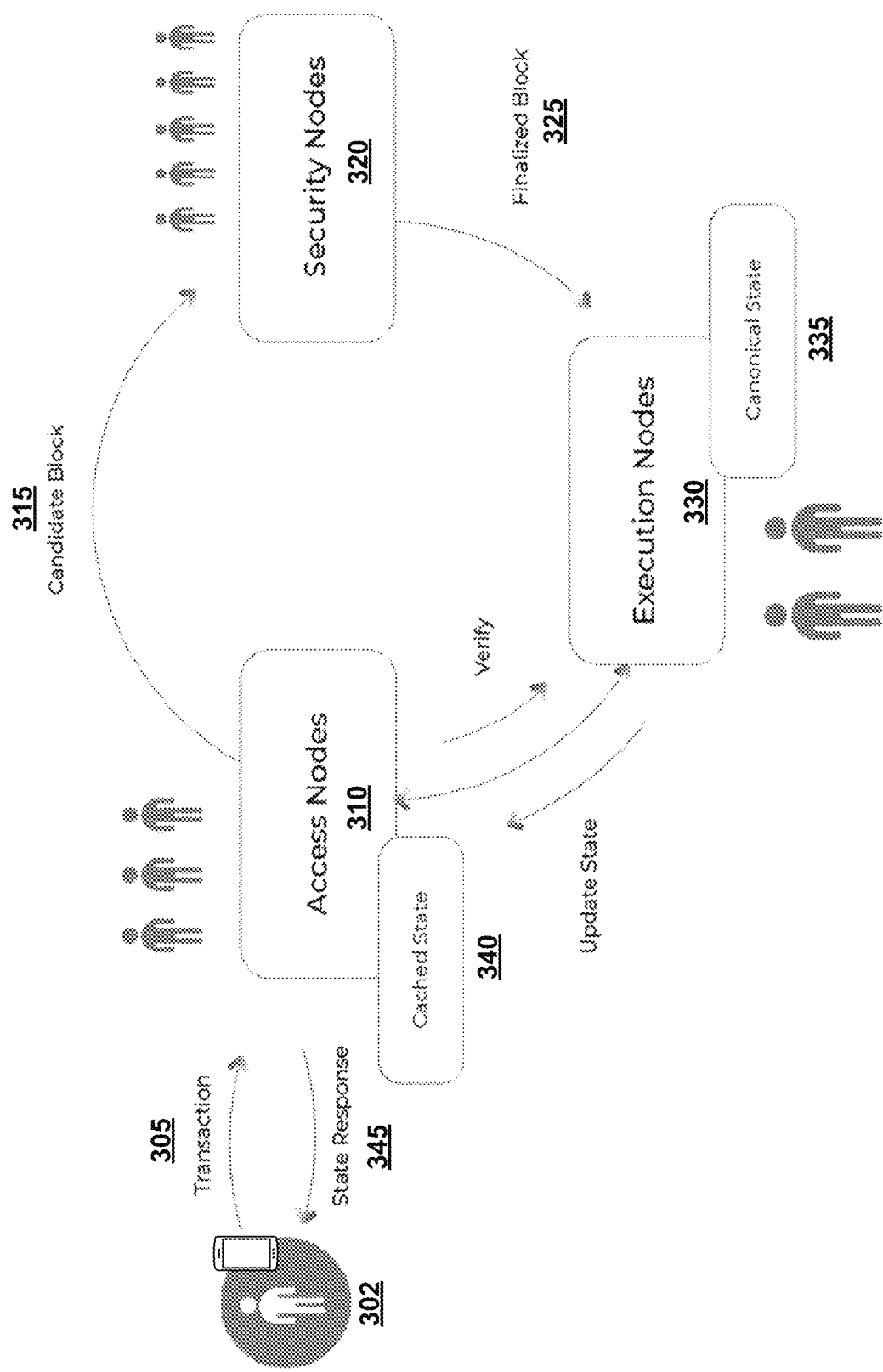
FIG. 3 depicts a non-limiting exemplary architecture for the described system.

In some embodiments, the computing devices 102-108 are deployed as nodes within the example decentralized computation system and form a peer-to-peer network. For example, the computing devices 102-108 may be employed within the described decentralized computation as an access node, a security node, or an execution node, within the formed peer-to-peer network, as illustrated in FIG. 3. In some embodiments, the formed peer-to-peer network is a distributed network where each network node (e.g., computing devices 102-108) is connected to every other node on the network directly or indirectly. As such, information (e.g., transactions) can be shared directly between nodes without the need of a central server. In some embodiments, the nodes employ a peer-to-peer protocol to communicate.

In some embodiments, the system may correspond with a decentralized blockchain that may be stored on each of the computing devices 102-108. In some embodiments, a set of the computing devices stored the blockchain. The blockchain includes blocks that comprise transactions. In some embodiments, such transactions are received, verified and executed by the example decentralized computation system. In some embodiments, the transactions stored to the blockchain include smart contracts. In some embodiments, a smart contract may be extended with custom functionality and invoked as a part of a transaction by an execution node within the formed peer-to-peer network, as illustrated in FIG. 3. For example, the computing devices 102-108 may be used by respective users 222-226 to receive transactions to be processed and stored within a block on the blockchain. In some embodiments, the computing devices 102-108 employ a virtual machine as an execution runtime to execute smart contract code. For example, such mechanism allows transitions from one state to another: given a certain block (in which a number of transactions are stored), and given a state s, performing the computation will bring the machine into a new state S'. In some embodiments, the state transition mechanism consists of accessing transaction-related accounts, computing operations, and updating/writing the state of the virtual machine. Whatever is executed on the virtual machine (e.g., smart contract code) may alter its state. In some embodiments, after executing all the transactions of a block, the current state may be stored.

FIG. 3 depicts an example of a general architecture for the example decentralized computation system, which can be deployed through, for example, the example environment of FIGS. 1-2. The general architecture includes a client 302, access nodes 310, security nodes 320, and execution nodes 330, which may be deployed through a device, such as devices 102-108 of FIGS. 1-2. In some embodiments, the access nodes 310 maintain network availability for the client 302 and answer queries related to the world state. In some embodiments, the security nodes 320 ensure the safety of the network by participating in a BFT consensus algorithm, which provides strong guarantees for blocks. In some embodiments, the execution nodes process the blocks (finalized blocks 325) once received from the security nodes 320. In some embodiments, the execution nodes can provide the computational power to determine the result of transactions, such as transaction 305, finalized by the security nodes 320, and store a resultant world state. A more detailed explanation of these roles is provided below.

In some embodiments, the example decentralized computation system employs a decentralized blockchain, such as the blockchain of FIGS. 1-2. In some embodiments, the job of a decentralized blockchain can be divided into a variety of component functions; some of those functions may be fully deterministic and have an objectively correct output, and some of those tasks may be subjective and require network-level consensus. The decentralized blockchain system can create an autonomous, leaderless, and decentralized system to reliably come to network consensus on something that is naturally subjective: what transactions are included in the shared state, and in what order (the "transaction log"). In some embodiments, such a subjective task may either require an all-powerful central authority to dictate the transaction log, or one of the many consensus systems that allow a decentralized network to determine a shared view of a canonical transaction log. Two other tasks of a blockchain may not be subjective, and may be fully deterministic: storing the transaction log, and determining the world state that results from a correct application of the contents of the log in consensus order. The primary bottlenecks preventing blockchains from reaching consumer scale fall into this second category.

In some embodiments, the example decentralized computation system is designed so that all Byzantine faults in deterministic processes have four important attributes: detectability, attributably, punishably, and correctability. In some embodiments, a deterministic process may have an objectively correct output. Meaning even a single, honest node in the network can detect deterministic faults, and prove the error to all other honest nodes by asking them to recreate part of the process that was executed incorrectly. Moreover, in some embodiments, the deterministic processes in the example decentralized computation system may be assigned to nodes using a verifiable random function (VRF). As such, any error that has been detected can be clearly attributed to those nodes that were responsible for that process. In some embodiments, all nodes participating in the example decentralized computation system, even in deterministic processes, must put up a stake that can be slashed if they are found to have exhibited Byzantine behavior. Since all errors in deterministic processes are trivially detectable and attributable, those errors can be reliably punished via slashing. In some embodiments, the described system must have a means to quickly undo errors as soon as they are detected. This serves to deter malicious actors from inducing errors that benefit them more than the slashing penalty.

The design of the described system was informed by the insight that many participants are needed to support the non-deterministic parts of the process, while far fewer are needed for deterministic processes because their properties dictate definitive detection, and, therefore, the punishment of those who do not adhere to the protocol. Therefore, the described system may separate deterministic processes (as depicted in FIG. 3) and may assign them to fewer, more powerful participants who are scrutinized by a broad audience. Fewer nodes make the deterministic elements of the network much more efficient, especially for executing computation. For example, one proof of concept shows that this approach can achieve more than 100,000 TPS, without any degradation of security guarantees. The proof of concept for performance in a testbed setup as a heterogeneous network of more than thirty nodes running in eleven different data centers on five continents. This is just one example of the improvements possible when problems are separated into their deterministic and nondeterministic parts and assigned accordingly.

In some embodiments, the access nodes 310 may mediate information exchange with the world outside the example decentralized computation system, which may help ensure systematic and timely communications regarding both state and history. In some embodiments, the access nodes 310 may be tasked with managing the transaction pool and collecting well-formed transactions, such as transaction 305 from client 302, to provide to security nodes 320. In some embodiments, a well-formed transaction may include credentials from a guarantor of the transaction. In some embodiments, when an access node 310 sees a well-formed transaction, access node 310 may hash the text of that transaction and sign the transaction to indicate two things: first, that it is well-formed, and second, that it will commit to storing the transaction text until the execution nodes 330 have finished processing it. In some embodiments, when a critical number of access nodes 310 have reviewed the transaction and concluded it is well-formed, they may transmit it to the security nodes 320 for review. The critical number of access nodes 310 may vary by embodiment. For example, the critical number of access nodes 310 may depend on various protocol parameters. In some examples, the critical number of access nodes 310 may be chosen in a way that a few malicious access nodes cannot threaten the integrity of the blockchain by prioritizing some transactions or censoring others.

In some embodiments, after both the security nodes 320 and the execution nodes 330 have built and processed a block, the access nodes 310 may query the execution nodes 330 for their output (e.g., the results of computations). In some embodiments, the access nodes 310 store a cache of that output received from the execution nodes 330. In some embodiments, the access nodes 310 provide the client 302 with the cached results (e.g., the state response 345) of computations without having to burden the execution nodes 330 with more direct queries. In some embodiments, a verifiable random function (VRF) determines which outputs from the execution nodes 330 that the access nodes 310 may query to check they were computed correctly. Ultimately, the access nodes 310 may keep the execution nodes 330 "honest." This may be performed to maintain a balance of power between the access, security, and verifiability criteria of decentralization provided by the described system. The provided protocols and underlying structures of the system are highly Byzantine fault tolerance (BFT) because, in some embodiments, even if there are a substantial number of byzantine errors in the pool of access node 310, the security nodes 320 are still required to approve the transactions they signed were reviewed by a critical amount of the network. The BFT protocol can protect the network from a few malicious access nodes or security nodes (e.g., "few" meaning less than some critical number) so that they cannot threaten the integrity and liveness of the network. Any intentional or non-intentional mistake by a node may be detectable, fixable, attributable, and punishable by the rest of the network.

In some embodiments, the access nodes 310 require high levels of bandwidth and low latency to communicate with the public as their queries and transactions may be answered and captured, respectively. In some embodiments, the access nodes 310 (e.g., the users 222-228 of FIG. 2) may be paid a flat fee (or other reward) for every transaction they guarantee, and for each they successfully verify. In some embodiments, the access nodes 310 are slashed if they provide collections that are ill-formed, or if they fail to store the transaction text that they said they would hold.

Slashing may be a mechanism built into blockchain protocols (e.g., proof of stake) to discourage node misbehavior and maintain the overall network security and availability. Similarly, incentives may be designed to incentivize protocol security, availability, and network participation. Slashing is a form of punishment and may include the removal of the node, monetary penalties and/or other punishments.

In some embodiments, the security nodes 320 participate in the consensus algorithm employed by the described system to achieve block finality to ensure the integrity of the blockchain. In this context, finality includes a finalized block 325 of transactions that have been signed by a critical majority and are confirmed to be both well-formed and stored by the access nodes 310. In some embodiments, the security nodes 320 contribute primarily to security and scale, as they are able to vote quickly on candidate blocks 315 that set the order necessary to know the deterministic output of a transaction. In some embodiments, the security nodes 320 validate that the signed transaction hashes submitted to them by the access nodes 310 are signed by a critical mass of access nodes as required by the described system. In some embodiments, the critical mass of access nodes is determined by a configurable threshold value.

The consensus algorithm (e.g., proof-of-stake algorithm, etc.) performed by security nodes 320 may be a subprotocol. The consensus algorithm may help the security nodes 320 to agree (e.g., reach a "consensus") on the next block to add to the chain.

In some embodiments, once the security nodes 320 have successfully come to consensus that the transactions presented were signed by the critical number of the access nodes 310, the transactions are deemed a finalized block 325. The security of the process within the described system relies on the security of the underlying consensus algorithm, some of the considerations of which are speed and the ability to support a large number of participants. In some embodiments, the consensus algorithm employed by the example decentralized computation system includes a variant of Casper CBC, Tendermint-derived SBFT, Hot Stuff, Fantomette, or others well suited to support many participants. In some embodiments, the finalized block may determine the order of the included transactions. In some embodiments, the ordering of transactions is based on the order of collections, and of ordering of the transactions within collections. In some embodiments, the ordering of these elements may correspond with a pseudo-random algorithm executed by the proposing node.

In some embodiments, the security nodes 320 provide a checkpoint against the access nodes 310 because they are the group checking that a critical number of the access nodes 310 reviewed and signed for the transaction. In some embodiments, the security nodes 320 are notably held accountable only by fellow security nodes 320. A common concern with PoW- and PoS-based systems is that a small subset of the population can control important resources, such as the mining or stake needed to produce and vote on blocks, which is a degradation of the security of the system. In some embodiments, by lowering the requirements to participate, the example decentralized computation system may make it more difficult or expensive to, for example, coordinate a Byzantine cartel or other collusive activity by bad actors.

In some embodiments, the security nodes 320 may have minimal bandwidth and computation requirements, allowing even a modest computing device, such as a smartphone or a low-power ARM® system, to participate in the voting process and ensure the safety of the network. Many networks may claim open participation through substantial to partake in the decentralized network. Maintaining such a threshold undermines the security of the network. Lowering the participation requirements, such as described above for the security nodes 320, preserves the coordination problem, which may be central to providing a high degree of BFT because it may be exceedingly difficult for a subset of bad actors to subvert the network. In some embodiments, the security nodes 320 may be paid for the transactions they include in a block. In some embodiments, participating in the consensus process requires these nodes to put up stake, which may be slashed if they sign an invalid block. In some embodiments, an invalid block fails to have the critical number of signatures from the access nodes 310.

In some embodiments, the execution nodes 330 compute the outputs of the finalized blocks 325 they are provided. In some embodiments, the execution nodes 330 execute a candidate block 315 that may have been finalized and provided by the security nodes 320 (e.g., finalized block 325). In some embodiments, the execution nodes 330 query the access nodes 310 for the transaction text that matches the hash they have been provided by the security nodes 320. With this data, the execution nodes 330 may be able to compute the output, which, in some embodiments, is later randomly queried by a randomly assigned subset of access nodes 310 to ensure honesty. In some embodiments, the execution nodes 330 may be responsible for at least some of the system's improvements in scale and efficiency because only a very small number of these powerful computer resources are required to compute and store the historical state.

In some embodiments, one of the execution nodes 330 presents a hashed commitment once it has computed the output of the finalized block 325 or a subset of the transactions within the finalized block 325. The hashed commitment may correspond with a state commitment, which may be a hash of the entire state of the blockchain after executing a new block. In some examples, this hashed commitment may correspond with a Merkle tree hash when the state of the blockchain is stored in a Merkle tree. In some embodiments, this output may be only revealed once its co-executors (e.g., other execution nodes 330 as determined by, for example, a VRF) have also submitted their outputs. This is important to ensure nodes are not spoofing each other's work. In some embodiments, once the execution nodes 330 have submitted their answers, the output is revealed. In some embodiments, once revealed, the output is subject to random queries and checks run by the access nodes 310. In some embodiments, the execution nodes 330 may have relatively low BFT. However, this does not compromise the overall security of the system because the process they perform is deterministic. For example, any bad actor may easily be detected and punished by the access nodes 310.

In some embodiments, this relatively small group of nodes (e.g., the execution nodes 330) has the most substantial technical requirements for processor speed and bandwidth because they may be tasked with executing or performing the computations necessary to determine the output of the network. In some embodiments, allowing for this degree of specialization can reduce computation costs by at least one thousand times, and possibly much more, when compared to other traditional distributed networks.

In some embodiments, although the execution nodes 330 are responsible for computing and storing the entire world state of the blockchain, the execution nodes 330 may not be required to answer all external queries about that state. In some embodiments, the execution nodes 330 may answer the access nodes 310 at least once during the verification period to confirm their output. In some embodiments, this query provides the access nodes 310 the answer (e.g., the state response 345) for future queries from the client 302, such as described above, which spares the execution nodes 330 of those excess queries burdening them in the future. However, in some embodiments, the execution nodes 330 can be punished (e.g., slashed) if they fail to provide answers about their output to the access nodes 310 when prompted. In some embodiments, the execution nodes 330 may be paid for their work at the end of the verification period, once their outputs have been verified. In some embodiments, the costs charged by the execution nodes 330 varies by computation and is likely to be based on the number of instructions the computation required.

In some embodiments, the common thread between these different node types (e.g., access node 310, security node 320, and execution node 330) may be their relationship to, and authority over, the state held by the network. For example, in some embodiments, the entirety of the world state may be held by each and every execution node 330 in order to perform computations. In some embodiments, once the execution nodes 330 have run the computations and determined the output, they may update the world state after which it is validated by the access nodes 310. In some embodiments, the execution nodes 330 must provide a Merkle proof for the output state in question. This complexity may allow for the validation of the integrity of the outputs.

In some embodiments, the access nodes 310 may cache the most recently updated or accessed data in a sharded fashion (e.g., the cached state 340), with each access node 310 holding a fraction of the overall canonical state 335. This cached state 340 may help ensure that data is easily accessible to answer user queries (e.g., provide the answer state 345 to clients 302) in the event the execution nodes 330 are busy and cannot answer. This ability to provide answers more quickly helps ensure access and the verifiability of the network for the public. In some embodiments, the access nodes 310 are also responsible for holding transaction data until a transaction is processed and the result verified by the execution nodes 330. In some embodiments, once processed, the transaction itself becomes part of the canonical state 345 and the access nodes 310 are no longer required to store the cached state 340 (e.g., the transaction text).

In some embodiments, when a transaction is generated (e.g., by one of the client devices 302) it includes: explicit code to be run and/or explicit data (e.g., a smart contract), and credentials from the account paying for the transaction, which can be different from the user account generating the transaction or the data holder. In some embodiments, this transaction is submitted to the network, where it is processed by the access nodes 310 to, for example, check the credentials. In some embodiments, the access nodes 310 sign the transaction to commit to holding that transaction until the execution nodes 330 have processed it and their output has been verified. In some embodiments, once a critical mass of the access nodes 310 have signed the transaction, it may be transmitted to the security nodes 320 to verify two things: 1) that a critical mass of access nodes 310 have seen the transaction, agreed to store it, and confirmed it is well formed, and 2) that the security nodes 320 will never confirm another block at that height, unless they are provided with proof that what they previously published was invalid.

In some embodiments, the security nodes 320 follow a BFT consensus algorithm to agree on the finalized block 325. In some embodiments, once a candidate block 305 is finalized by the security nodes 320, the finalized block 325 may be transmitted to the execution nodes 330 for computation. In some embodiments, a VRF is employed to determine a subset of the execution nodes 330 that are responsible for computing each finalized block 325. In some embodiments, once an execution node 330 has computed the output, the execution node 330 produces a hashed commitment of the result. In some embodiments, when all of the selected nodes (e.g., the execution nodes in the determined subset) have submitted their commitments, they may reveal the unencrypted result output. In some embodiments, when this output is shown to be the same from all of the participating execution nodes 330, each of the access nodes 310 uses a VRF to select a small number of transactions to be verified. In some embodiments, once the answer is provided to the access nodes 310, they cache it to answer future queries from the client 302. For example, when a user wants to retrieve a state from the system, they may pose a query (e.g., through the client 302) to an access nodes 310. For example, the query may be in a form such as "what is the contents of this register at this block height?" In some embodiments, the access nodes 310 will either fulfill the query through the cached state they hold, or they can query the execution nodes 330 for the output.

In some embodiments, a transaction, and the respective block that it is include within, may be considered canonized only after a verification period is over. In some embodiments, during the verification period, for example, the results are open to both the access nodes 310 and the public to submit proofs of an incorrect output. In some embodiments, a verification period may be up to a few hours long.

In some embodiments, by dividing the architecture of the example decentralized computation system as described above, a number of benefits may be achieved: synchrony, efficiency, and scale, among others. For example, developing in a decentralized environment comes with many uncertainties for developers, not the least of which is reading from data that changes before they can write to it. With this in mind, strong serializability guarantees, an outcome equivalent to a sequential schedule without overlapping transactions, are one of the most important things a decentralized development environment, such as an environment provided by the example decentralized computation system can offer. By committing to the order of transactions, transactions can appear to have been executed in an absolute order so that a developer can reason about the system, even if some were executed in parallel to improve throughput. Some systems resort to locking mechanisms to preserve serializability, especially when transactions move between shards. In some embodiments, the example decentralized computation system protocol's agreement on order before execution nodes 330 determine output, however, ensures that once a transaction is ordered, there is certainty about its outcome.

In some embodiments, to efficiently employ resources, the example decentralized computation system may comprise a Proof of Stake (PoS)-based system and is designed to eliminate as many redundant tasks as possible. For example, in a classic blockchain implementation, every node may be required to review every transaction and store all the states. By dividing deterministic and non-deterministic tasks and assigning them to resources that can specialize in their respective execution, the throughput of the example decentralized computation system may be immensely improved.

In some embodiments, at an architecture level, the security of the example decentralized computation system provided by 1) the division of power and accountability between the three different node types, 2) the high degree of participation supported by the consensus algorithm, and 3) designating the access nodes 310 as the interfaces of the network. These design elements may surface differently to address each of the common attacks decentralized systems often face. The access and verifiability requirements of the example decentralized computation system ensure both the broader network and the public are able to verify the process and dispute it during the verification period. While the output of a computation is deterministic, in some embodiments, once its order is set in the finalized block 325, a verification period remains for the state to be recomputed in the event that a provable error is submitted to the network, thus ensuring the opportunity for detectability. For example, in some embodiments, the access nodes 310 sign every transaction to assure a signatory guarantor exists to pay for the transaction, guaranteeing attribution. In some embodiments, all nodes are staked relative to the value they stand to lose if they are removed from that part of the network, which assures punishment (e.g., slashed) if an infraction is committed.

In the blockchain context, censorship resistance may correspond with the difficulty for one group to deny another group's access to the network. As such, in some embodiments, a role of the access nodes 310 is to guarantee access and ensure that anyone can audit and submit transactions. In addition to the architecture-level measures put in place to combat censorship, in some embodiments the security nodes 320 may only see transaction hashes. Therefore, in such embodiments, for the security nodes 320 to censor a transaction, they would need to know the hash of its signatories, data, and actions. In some embodiments, the security nodes are generally prevented from undermining the described system by the sheer volume of co-participants. Thus, collusion on any problem would be extremely difficult to coordinate.

In some embodiments, the security nodes 320 may protect against a double spend attack. For example, in some embodiments, broad participation in this group materially decreases the risk of a small group colluding to honor an alternative block at the same height. For example, when this pool of nodes is presented with a group of transactions, they come to consensus on both a sufficient number of the access nodes 310 signing the group, and on that group forming the only block they will honor at that height—both at that moment and in the future. In some embodiments, any other block presented will be rejected by the network, unless a fraud proof to reject the block for one at a competing height is successfully submitted during the verification period.

In a front running attack, an adversarial node decides it is advantageous to insert its transaction before another. Such a move could be as simple as placing a higher bid in front of a competing bid, or as devious as strategically inserting a transaction to falsely manipulate its output. To combat this, in some embodiments, the execution nodes 330 perform a VRF to compute the order of the transactions. This ensures the order of the transactions is neither knowable nor able to be dictated by anyone until after the transaction has already been deterministically ordered.

In some embodiments, the access nodes 310 and the security nodes 320 each have a say in the transactions included in a block. In such embodiments, when either group is able to set the order of transactions beforehand, it presents an opportunity for them to exploit that order and prioritize their own transactions. By requiring the execution nodes to execute a VRF to reveal the canonical order of the transactions (the canonical state 335) in some embodiments, there is no way for nodes to manipulate the sequence. In some embodiments, parameters used to determine the VRF will be deterministic and dependent on an output from the security nodes 320.

Resistance to a potential flurry of fake accounts and activities is one aspect to maintaining the throughput of the network, as such malicious transactions can cause immense strain on the nodes. In some embodiments, as the interface of the network, the access nodes 310 are aware of the balance of each of the accounts signing a transaction. In some embodiments, a user who pays for transactions must also hold a minimum balance to submit a transaction to ensure against spam.

In some embodiments, the first process performed by the access nodes 310 is to determine the list of transactions that should be submitted to the security nodes 320 for inclusion in a block, and the order in which they should occur. This process is a "pure consensus problem" where there are many possible answers to this problem, each of which is equally "right." However, the network may agree on a single answer because different choices would lead to different canonical state.

Once the ordered list of transactions has been agreed upon, there may be a single, objectively-correct answer as to what canonical state can result from processing those transactions. For example, any node that processes that transaction list without errors can end up with exactly the same canonical state as any other node that correctly processes that same transaction list. In some examples, blockchain computations may be fully deterministic to allow them to be verified by other nodes. Thus, there may be two problems with two performance profiles. First, the ordering process may be a pure consensus problem that can be solved by a variety of BFT consensus algorithms. In some embodiments, such a process may require a lot communication between consensus nodes (e.g., communication messages greater than a threshold value) but may not be computationally complex. Network security comes directly from this process as the more nodes that are involved in this process, the harder it is to subvert the chain. Second, in some embodiments, the computation process may require computationally powerful nodes when the network is busy, but it does not need a large number of nodes as any of them can objectively "check the work" of a compute node and prove an error if it occurs. In some embodiments, when a node presents an invalid output, it loses some or all of its stake and the incorrectly processed computations can be re-run with honest nodes. The result of the above process, in some embodiments, is a single, unsharded network that is able to achieve maximum throughput without degradation of security due to centralization.

Example Integration of the Schema

In some embodiments, the above example decentralized computation system comprises a blockchain that achieves a throughput greater than a threshold value based on a pipelined architecture and the separation of node roles in the network. As described above, the execution of the transactions in a block are performed by the execution nodes 330. In some embodiments, the integration of the described proof scheme (e.g., specialized proof of confidential knowledge) can include execution being re-run by another type of nodes, referred to as verification nodes (not shown), to guarantee the correctness of the computation (e.g., acting as a user). The execution process by each of these nodes, both the execution nodes 330 and the verification nodes, results in an execution trace, which can be considered as a proof of executing the transactions of a block.

The execution trace can comprise a series of steps that trace the execution of the block transactions. The identification of the steps can include writing to and from the blockchain state.

In some embodiments, in order to ensure that the verification nodes are doing the right job of verifying the computation and are not validating the execution nodes 330 results by skipping the expensive check, integration of the proof scheme forces each verification node to publish a proof of knowing the execution trace. Publishing the execution trace itself results in any verification node claiming they computed the transactions. Therefore, the execution trace is the secret in the scenario and must remain protected. The execution nodes 330 and verification nodes publish a specialized proof of knowing the execution trace (e.g., the proof).

In some embodiments, the access nodes 310 acting as consensus nodes collect all the proofs and verify they were all generated from the same execution trace. If the verification is valid, the execution trace should be valid as the protocol makes sure there is a threshold of honest verification nodes that compute the execution trace correctly. Any mismatch in the verification is detectable and attributable to the dishonest party.

In some embodiments, the verification nodes re-compute transactions in a parallel manner while consensus nodes 310 guarantee the safety of the results using the above described proof. In some embodiments, the above described example decentralized computation system employs a process or protocol to implement the scheme that is concise and efficient. This process is described herein according to a formal generic description of a scheme as well as its security definition. In some embodiments, the process includes a construction based on the Boneh-Lynn-Shacham (BLS) signature scheme. The below description provides a proof of security under the appropriate computation assumptions for this scheme.

In some embodiments, the execution nodes 330 perform the heavy computation of all transactions in a finalized block. The described process introduces a mechanism to detect and attribute faulty results by assigning the verification nodes to re-compute the block transactions. In some embodiments, this computation is broken up into chunks to allow a lighter computation verification in a parallel and independent manner. In some embodiments, the consensus nodes 310 commit to the block results and make sure the computation was verified by a majority of verification nodes. In some embodiments, the described BLS-based process implementation involves employing the intermediate results of a chunk computation as a proof of executing the transactions of that chunk with an assumption that the intermediate results cannot be derived more cheaply than by executing the entire chunk.

In some examples, the chunks are broken using a chunking algorithm. The chunking algorithm may divide a block into chunks so that the chunks have comparable computation time. In some examples, the verification nodes compute the block in a lighter, parallel and independent manner thanks to the chunks.

In some embodiments, the execution nodes 330 provide a proof as a commitment to the computation intermediate results of each block chunk and the verification nodes provide another as a commitment to their own intermediate results of each chunk they verify. In some embodiments, the role of the consensus nodes 310 is to arbitrate by verifying proofs of each chunk are consistently generated from the same intermediate results. A single honest verification node allows the protocol to detect a faulty result in a chunk computation. This process ensures the block computation is correct with high probability. Although the employed process prevents "lazy" verification nodes from claiming they re-computed the chunk, it does not prevent or detect collusion with any party that has computed the intermediate results. However, a single non-colluding node generating a proof from honest results is enough to help the consensus nodes 310 uncover other faulty proofs.

In some embodiments, the BLS-based process includes a scheme that allows a party to check two or more signatures have signed the same secret message without learning more about the secret itself (e.g., the pairing equality check). In some embodiments, the BLS-based process construction in particular also offers some elegant properties beyond the ones required by a scheme employed within the example decentralized computation system.

Relation to the Verifier's Dilemma

In some examples, the system can help mitigate the Verifier's Dilemma. The Verifier's Dilemma can arise in distributed systems where some participating nodes are supposed to verify the work of other node(s). Moreover, for a system where compensation for a verifier increases (statistically) with its speed and where the results, which the verifiers are checking, are correct with a probability sufficiently close to one, most blockchains have built-in incentives for nodes to run as fast as possible and to deliver correct results. Even if the verifiers are compensated for their work, blindly approving all results can still be the most profitable strategy in such an environment, because this strategy not only saves time but also expenditures for hardware and energy for verification work. Also, nodes adopting such strategy undermine the network's resilience to malicious actors in the long run.

In some embodiments, the described system mitigates the Verifier's Dilemma through its architecture. Specifically, in some embodiments, verification nodes have to prove they know the execution trace of the chunks they were assigned to; they are slashed for approving wrong results; and a minority of honest verification nodes checking a wrong result is sufficient to slash the execution node(s) that generated the wrong result as well as all the verification nodes that approved it.

Theoretical/Mathematical Abstraction of the Problem

Let $G_1$ and $G_2$ be two cyclic groups and let $g_1$ and $g_2$ be generators of $G_1$ and $G_2$ respectively. The Computational co-Diffie-Hellman (co-CDH) problem is to compute $g_1^{xy}$ given $(g_1, g_1^x, g_1^x, g_2, g_2^y)$. The co-CDH assumption states that no probabilistic polynomial-time algorithm solves the co-CDH problem with a non-negligible probability.

A related problem is the Divisible Computational co-Diffie Hellman problem (co-DCDH): given $(g_1, g_1^{xy}, g_2, g_2^y)$, compute $g_1^x$. The co-DCDH assumption is defined analogously to the co-CDH problem. That two assumptions are equivalent is shown.

Lemma 1

The co-DCDH and co-CDH assumptions in $(G_1, G_2)$ are equivalent.

Proof. An adversary A that solves the co-DCDH problem also solves the co-CDH problem and vice versa is shown.

co-CDH$\Rightarrow$co-DCDH:

A is given a co-DCDH challenge $(g_1, g_1^{xy}, g_2, g_2^y)$ and has access to a co-CDH solver algorithm
$A_{co}$-cDH such that $A_{co}$-cDH $(r_1, r_1^a, r_2, r_2^b)$ for any random $(r_1, r_2)$ in $G_1 \times G_2$.

A computes $A_{co}$-CDH $(g_1, g_1^{xy}, g_2^y, g_2) = A_{co}$-CDH $(g_1, g_1^{xy}, g_2^y, (g_2^y)^{y-1})$, which outputs $(g_1^{xy})^{y-1} = g_1^x$ and solves the co-DCDH challenge.

co-CDH$\Leftarrow$co-DCDH:

A is given a co-CDH challenge $(g_1, g_1^x, g_2, g_2^y)$ and has access to a co-DCDH solver algorithm
$A_{co}$-DCDH such that $A_{co}$-DCDH $(r_1, r_1^{a \cdot b}, r_2, r_2^b) = r_1^{a \cdot b \cdot b^{-1}} = r_1^a$ for any random $(r_1, r_2)$ in $G_1 \times G_2$.

A computes $A_{co}$-DCDH $(g_1, g_1^x, g_1^x, g_2^y, g_2) = $A$co$-DCDH $(g_1, g_1^x, g_2^y, (g_2^y)^{y-1})$, which outputs $g_1^{x \cdot (y^{-1})^{-1}} = g_1^{xy}$ and solves the co-CDH challenge.

The two problems are equivalent and therefore the two assumptions are also equivalent.

BLS Signatures

As a brief review the BLS signature scheme, let $G_1$, $G_2$ and $G_T$ be three cyclic groups of prime order p where $(G_1, G_2)$ is a bilinear group pair. Let e be an efficiently computable non-degenerate pairing e: $G_1 \times G_2 \rightarrow G_T$, and H be a hash function H: $\{0,1\}^* \rightarrow G_1$ (modeled as a random oracle). The multiplicative notation is used for the three groups. The signature scheme is defined as follows:

BLS-KeyGen( )$\rightarrow$(sk,pk), where sk$\xleftarrow{R} Z_p$ and pk$\leftarrow g_2^{sk} \in G_2$.

BLS-Sign(sk,m)$\rightarrow \sigma$, where $\sigma \leftarrow H(m)^{sk} \in G_1$.

BLS-Verify(pk, m, a)$\rightarrow v \in \{OK, FAIL\}$, where v is OK if e(H(m),pk) and FAIL otherwise.

Dan Boneh, Ben Lynn, and Hovav Shacham. Short signatures from the Weil pairing. In ASIACRYPT, December 2001 (herein after Boneh et al) proved the signature scheme is secure against existential forgery under the chosen message attack, in the random oracle and under co-CDH assumption in $(G_1, G_2)$.

Registered Key and Knowledge of Secret Key Models

Thomas Ristenpart and Scott Yilek. The power of proofs-of-possession: Securing multiparty signatures against rogue-key attacks. In EUROCRYPT, May 2007 (herein after Ristenpart et al.) define the registered key model, which is a protocol R=(Reg-Prove, Reg-Verify):

Reg-Prove(sk, pk)$\rightarrow \pi$ generates a registration proof.

Reg-Verify(pk, $\pi$)$\rightarrow$\{OK, FAIL\} outputs OK if the proof is valid for pk and FAIL otherwise.

If no key registration is required, (Reg-Prove, Reg-Verify) can be replaced with vacuous functions as follows: Reg-Prove outputs the empty string, and Reg-Verify outputs OK on any input.

In the proof based on BLS Signatures section below, a class of key registration protocols is considered in which parties prove knowledge of the secret corresponding to their public key; this is called the knowledge of secret key (KOSK) model. In this model, all parties have access to the functions $R_{KOSK}$=(KOSK-Prove, KOSK-Verify), which generate and verify proofs, respectively.

To instantiate this model, parties are required to use a zero-knowledge proof of knowledge (ZKPK) of their secret. Key registration protocols based on ZKPKs provide two additional algorithms, KOSK-Simulate and KOSK-Extract, which they inherit from the underlying ZKPK:

KOSK-Simulate(pk)→π is a simulator that, given access to the randomness used for proof verification, outputs a proof that is computationally indistinguishable from a real proof KOSK-Extract(pk, π)→sk is an extractor that interacts with (in particular, rewinds) the party who generated it to output sk from a convincing proof.

Simulation and extraction are standard notions for ZKPKs, so they are not defined more formally.

Proof Scheme

In the example decentralized computation system, honest execution and verification nodes generate a proof using their staking private keys and a secret referred to herein as confidential knowledge. A consensus node verifies the proofs generated by execution and verification nodes using the corresponding public keys. The verification process should ensure that all proofs were generated based upon the same confidential knowledge. Based on this use-case, a generic definition of a scheme is given.

Scheme Definition

Definition 1

A Specialized Proof of Confidential Knowledge may comprise four algorithms:

SP-Setup($1^\lambda$)→pp. Generate public parameters pp, which are an implicit input to the remaining algorithms.

SP-KeyGen$\stackrel{R}{\leftarrow}$(sk, pk) Output a private and public key pair.

SP-Prove(sk, m)→a. Generate proof a for message m under secret key sk.

SP-Verify ($pk_a$, $\sigma_a$, $pk_b$, $\sigma_b$)→v∈{OK, FAIL}. For $sk_a$ the secret corresponding to $pk_a$, and likewise $sk_b$ to $pk_b$, return OK if $\exists m$: SP-Prove($sk_a$,m)=$\sigma_a \wedge$ SP-Prove($sk_b$,m)=$\sigma_b$ and FAIL otherwise, except with at most negligible probability.

If the proofs are generated honestly from the same confidential knowledge, SP-Verify is required to output OK with high probability, which defines the correctness of the scheme.

Definition 2

Correctness. A scheme is correct if $$Pr\left[SP\text{-Verify}(pk_a, \sigma_a, pk_b, \sigma_b) = OK : \begin{array}{l}(sk_a, pk_a) \leftarrow SP\text{-}KeyGen() \\ (sk_b, pk_b) \leftarrow SP\text{-}KeyGen() \\ m \stackrel{R}{\leftarrow} \{0,1\}^* \\ \sigma_a \leftarrow SP\text{-}Prove(sk_a, m) \\ \sigma_b \leftarrow SP\text{-}Prove(sk_b, m)\end{array}\right] \geq$$

$$1 - negl(\lambda)$$

where negl($\lambda$) is a negligible function in the security parameter $\lambda$.

The scheme is also defined in the Registered Key Model section above. In this case, the correctness condition holds only with respect to registered keys.

The SP-Verify definition only requires the existence of a message m consistent with $\bar\sigma_a$ and $\bar\sigma_b$. While this definition suffices for two parties, extending it to three or more parties is more subtle. To see why, consider the case that the owners of $sk_a$ and $sk_b$ share a secret $m_1$, while the owners of $sk_a$ and $sk_c$, share a secret $m_2$. By the definition of SP-Verify, SP-Verify($pk_a$, $\sigma_a$,$pk_b$, $\sigma_b$) and SP-Verify($pk_a$, $\sigma_a$,$pk_c$, $\sigma_c$) might both output OK even when $m_1 \neq m_2$. As a result, these two checks are not sufficient to guarantee that the owners of $sk_b$ and $sk_c$, share any secret.

Recall, however, that in the example decentralized computation system the verification process can be employed to ensure that the holders of $sk_a$, $sk_b$, and $sk_c$, all share the same secret knowledge m (and likewise for groups larger than three). To reflect this property, strong transitivity for a scheme is defined.

Definition 3

Strong transitivity. A scheme satisfies strong transitivity if for all integer n≥3, for all valid key-pairs ($sk_1$, $pk_1$), . . . , ($sk_n$, $pk_n$), and for all proofs $\sigma_1$, . . . , $\sigma_n$, the following property is satisfied:

$$\left(\begin{array}{c}\forall i \in \{2, \ldots, n\} \\ SP\text{-Verify}(pk_1, \sigma_1, pk_i, \sigma_i) = success\end{array}\right) \Rightarrow$$

$$\left(\begin{array}{c}|\exists m: \\ \forall i = \{1, \ldots, n\}, SP\text{-Prove}(sk_i, m) = \sigma_i\end{array}\right)$$

If there exists a message m such that for all i, SP-Prove ($sk_i$,m)=$\sigma_i$, then all the proofs $\sigma_i$ verify against each other, i.e., for all 1≤i,j≤n,j, SP-Verify($pk_1$, $\sigma_1$, $pk_i$, $\sigma_i$)=success.

The strong transitivity definition states that if multiple proofs verify against a same reference proof $\sigma_i$, then not only these proofs should verify against each other (transitivity), but there exists a message m from which all these proofs (including the reference proof) could be generated.

In the example decentralized computation system, an execution node generates a reference proof, while multiple proofs are generated by the different verification nodes. For a scheme satisfying strong transitivity, it suffices to verify all proofs against the single execution node's proof to ensure all nodes share the same secret knowledge.

Scheme Security

A consensus node does not require any information about the confidential knowledge, other than two proofs and the corresponding keys, to run the SP-Verify algorithm. Intuitively, the confidential knowledge should remain secret to all parties in the network except those who executed a block. This means that a proof should not allow recovering the confidential knowledge.

More specifically, the scheme should be resistant against malicious actors that either recover the secret knowledge or forge a proof without access to that knowledge. In the example decentralized computation system, such attacks might be mounted by "lazy" verification nodes that aim to skip costly block execution while claiming they know the secret. Attackers may also attempt to forge a proof on behalf of another node, for example, to accumulate more "votes" on a faulty result.

Intuitively, generating a proof requires knowing two secrets, a key sk and a message m. This intuition is formalized below via two security games, each between a challenger C and an adversary A. The first game, knowledge-forgery, models the ability of a lazy node to forge a proof under its own key without knowing the confidential knowledge m. The second game, key-forgery, models the ability of a malicious node to create a proof for some chosen m under another node's public key without knowing the corresponding secret key. These games are defined assuming a key registration scheme (Reg-Prove, Reg-Verify), which can be the vacuous scheme if no registration is required.

Definition 4

The knowledge-forgery game.

Setup. C samples a random message $m \xleftarrow{R} \{0,1\}^*$.

Query. A makes any number of queries to C. On each such query, C samples a fresh key $(sk_i, pk_i) \xleftarrow{R}$ SP-KeyGen( ), computes a registration proof $\pi \leftarrow$ Reg-Prove$(sk_i, pk_i)$ and a proof $\sigma \leftarrow$ SP-Prove$(sk_i, m)$, and sends $(pk_i, \pi_i, \sigma_i)$ to A.

Output. The adversary outputs $(pk_a, \pi_a, \sigma_a)$, winning the game if $pk_a \notin \{pk_i\} \wedge$ Reg-Verify$(pk_a, \pi_a) = OK \wedge \nexists i:$ SP-Verify $(pk_a, \sigma_a, pk_i, \sigma_i) = OK$ Definition 5

The key-forgery game.

Setup. C samples $(sk_c, pk_c) \xleftarrow{R}$ SP-KeyGen( ), computes $\pi \leftarrow$ Reg-Prove$(sk_c, pk_c)$, and sends $(pk_c, \pi_c)$ to A. C also initializes two lists: $L_m$, which is initially empty, and $L_k$, which initially contains the tuple $(sk_c, pk_c)$.

Query. A may make any number of two types of query, in any order:

Q1: A sends $(m_i, pk_q)$ to C. C retrieves the first tuple $(sk, pk)$ in $L_k$ for which $pk = pk_q$; if there is no such tuple, C returns $\perp$. Otherwise, C computes $\alpha_i \leftarrow$ SP-Prove$(sk_i, m_i)$ and sends $\sigma_i$ to A. Finally, if $pk = pk_c$, C adds $m_i$rni to the list $L_m$.

Q2: A sends an empty query to C, who samples $(sk_i, pk_i) \xleftarrow{R}$ SP-KeyGen( ), $(sk_i, pk_i)$ to the list $L_k$, computes $\pi_i \leftarrow$ Reg-Prove$(sk_i, pk_i)$, and sends $(pk_i, \pi_i)$ to A.

Output. A outputs $(m_o, \sigma_a, pk_o)$ and wins if $m_o \notin L_m \wedge \exists (sk, pk) \in L_k: pk = pk_o \wedge$ SP-Verify$(pk,$SP-Prove$(sk, m_o), pk_c, \sigma_o) = OK$ One could define a third game to capture the case where an adversary does not have either the confidential knowledge or the secret key. This case corresponds to forging a proof in the example decentralized computation system to claim a target node has access to some secret when the attacker does not know either the secret or the target's key. This forgery is clearly harder than the two other games: an adversary with an algorithm that succeeds at such a forgery could easily win either of the other two games. Therefore, this game is not considered.

Definition 6

Unforgeability. A scheme is secure against knowledge-forgery if no probabilistic polynomial-time adversary A wins knowledge-forgery, except with at most negligible probability. A scheme is secure against key-forgery if no probabilistic polynomial-time adversary A wins key-forgery, except with at most negligible probability. A scheme is unforgeable if it is secure against both knowledge-forgery and key-forgery.

One further property of a scheme, non-malleability, is defined. Intuitively, for a proof $\sigma_b$, and two public keys, $pk_a$ and $pk_b$, given a proof $a_a$ that verifies against $(\sigma_b, pk_b, pk_a)$ it is infeasible to produce a distinct proof $\sigma'_a$ that also verifies against $(\sigma_b, pk_b, pk_a)$. Implementations of the scheme via various systems, such as the above example decentralized computation system, do not require to have this property, but in practice non-malleability can eliminate subtle attacks.

Definition 7

Non-malleability. A scheme is non-malleable if for all probabilistic polynomial-time adversaries A, $$Pr\left[ SP\text{-Verify}(pk_a, \sigma'_a, pk_b, \sigma_b) = OK : \begin{array}{l} (sk_a, pk_a) \leftarrow SP\text{-}KeyGen() \\ (sk_b, pk_b) \leftarrow SP\text{-}KeyGen() \\ m \xleftarrow{R} \{0, 1\}^* \\ \sigma_a \leftarrow SP\text{-}Prove(sk_a, m) \\ \sigma_b \leftarrow SP\text{-}Prove(sk_b, m) \\ \sigma'_a \leftarrow \mathcal{A}(pk_a, \sigma_a, pk_b, \sigma_b) \end{array} \right] \leq negl(\lambda)$$

A slightly stronger notion related to non-malleability is uniqueness:

Definition 8-Uniqueness

A scheme satisfies uniqueness if for all proofs $\sigma_a$ and for all public keys $pk_a$ and $pk_b$, there exists a unique proof ab such that SP-Verify $(pk_a, \sigma_a, pk_b, \sigma_b) = OK$.

Corollary 1

A scheme satisfying uniqueness is also non-malleable.

A Scheme Based on BLS Signatures

In this section, the scheme is implemented with BLS signatures and defined. This may be referred to a BLS-SPoCK scheme, or incorporating the BLS signatures with the Specialized Proof of Confidential Knowledge scheme discussed herein.

Definition 9

BLS-SPoCK comprises four algorithms: BS P-Setup, BSP-KeyGen, BSP-Prove and BSP-Verify.

BSP-Setup$(1^\lambda) \rightarrow pp_{BLS}$: Output public parameters comprising:
  A bilinear group pair $(G_1, G_2)$ of order p with generators $g_1$ and $g_2$, respectively.
  A target group $G_T$ of order p.
  A non-degenerate pairing e: $G_1 \times G_2 \rightarrow G_T$.
  A hash function H: $\{0,1\}^* \rightarrow G_1$ modeled as a random oracle.

BSP-KeyGen( ) $\rightarrow$(sk, pk): Output (sk, pk)$\leftarrow$BSP-KeyGen( )$\in (Z_p \times G_2)$.

BSP-Prove(sk, m) $\rightarrow \sigma$: Output $\sigma \leftarrow$BSP-Sign(sk, m)$\in G_1$.

In other words, $\sigma$ is a BLS signature of the message m under the private key sk.

BSP-Verify$(pk_a, \sigma_a, pk_b, \sigma_b) \rightarrow v \in \{OK, FAIL\}$: Output OK if $e(\sigma_a, pk_b) = e(\sigma_b, pk_a)$ Otherwise, output FAIL.

As such, verification may be done using a pairing equity check, including using the pairing feature discussed herein.

Lemma 2

The BLS-SPoCK scheme is a correct scheme.

Proof. For any message m, and key pairs $(sk_a, pk_a)$, $(sk_b, pk_b)$, by the definition of e the following in provided:

$e(BSP\text{-}Prove(sk_a, m), pk_b) = e(H(m)^{sk_a}, g_2^{sk_a \cdot sk_b}) = e(H(m)^{sk_b}, g_2^{sk_a})$.

This means that $e(\text{BSP-Prove}(sk_a,m),pk_b)=e(\text{BSP-Prove}(sk_b,m),pk_a)$, satisfying Definition 2.

Lemma 3

The BLS-SPoCK scheme satisfies strong transitivity.

Proof. Let an integer n be larger than 3, and let a set of n valid key-pairs be $(sk_1, pk_1), \ldots, (sk_n, pk_n)$, and a set of n proofs be $\sigma_1, \ldots, \sigma_n$ such that:

$$\forall i \in \{2, \ldots, n\}: \text{BSP-Verify}(pk_1,\sigma_1,pk_i,\sigma_i)=OK$$

By the bilinearity of the pairing e, and since $G_T$ is a cyclic group of a prime order, $\sigma_1^{sk_i}=\sigma_i^{sk_1}$ is deduced and thus $\sigma_1^{sk_1^{-1}}=\sigma_i^{sk_n^{-1}}$ for all $1 \leq i \leq n$. Then $h=\sigma_1^{sk_1^{-1}}=\sigma_n^{sk_n^{-1}}$ is an element in $G_1$ for which some message m exists satisfying $H(m)=h$. The message m clearly satisfies $\sigma_i=H(m)^{sk_i}=\text{BSP-Prove}(sk_i, m)$ for all $1 \leq i \leq n$, which establishes strong transitivity.

Corollary 2

The BLS-SPoCK scheme satisfies uniqueness (Def 8).

Proof. Let $pk_a, pk_b \in G_2$ and $\sigma_a \in G_1$. Notice that an element of $G_1$ that verifies against $\sigma_a$, $pk_a$, and $pk_b$ can be written as $$\sigma = \sigma_a^{sk_b \cdot sk_a^{-1}}.$$

$\sigma$ is therefore the unique element of $G_1$ that verifies against $pk_a$ and $pk_b$.

Corollary 3

The BLS-SPoCK scheme is non-malleable.

Security Proof

In this section, BLS-SPoCK scheme is shown to be secure against forgery as in Definition 6. That BLS-SPoCK is instantiated in the KOSK model using a Schnorr zero-knowledge proof of knowledge of discrete log is assumed.

Theorem 1

The BLS-SPoCK scheme is secure against knowledge forgery under the co-CDH assumption in $(G_1, G_2)$ in the KOSK model.

Proof. An adversary $A_{know}$ that breaks knowledge-forgery can be used as a black box to break co-DCDH (and thus co-CDH; Lem 1) is shown. To do so, an algorithm $C_{know}$ is constructed that acts as the challenger for the knowledge-forgery game and the adversary for the co-DCDH game.

To begin, $C_{know}$ requests a co-DCDH challenge $(g_1, g_1^{x \cdot y}, g_2, g_2^{x \cdot y})$. On each of A's queries, $C_{know}$ samples $r_i \xleftarrow{R} Z_n$; sets $$pk_i = (g_2^y)^{r_i}, \sigma_i = (g_1^{x \cdot y})^{r_i},$$

and $\pi_i \leftarrow \text{KOSK-Simulate}(pk_i)$; and sends $(pk_i, \pi_i, \sigma_i)$ to A. Finally, $A_{know}$ responds with $(pk_a,\pi_a,\sigma_a)$ and $C_{know}$ aborts if KOSK-Verify$(pk_a, \pi_a)$=FAIL or if $\exists i$: BSP-Verify$(pk_a, \sigma_a,pk_i, \sigma_i)$=OK.

Assume that C does not abort, which happens with non-negligible probability by the assumption Cknow that $A_{know}$ breaks knowledge-forgery. Then $C_{know}$ wins the co-DCDH game by first computing $sk_a \leftarrow \text{KOSK-Extract}(\pi_a)$, then answering $$\sigma_a^{sk_a^{-1}}$$

for the co-DCDH game.

To see why this works, notice that since BSP-Verify returned OK for some i, that $e(\sigma_a, pk_i)=e(\sigma_i, pk_a)$ is provided, meaning that $\sigma_a=g_1^{sk_a \cdot x}$ and thus $$\sigma_a^{sk_a^{-1}} = g_1^x,$$

the correct co-DCDH answer. Further, all $pk_i$, $\pi_i$, and $\sigma_i$ are distributed as in the real knowledge-forgery game: $sk_i=y \cdot r_i$ is a uniformly random secret key corresponding to $pk_i$, $\sigma_i= (g_1^x)^{sk r_i}$ and $\pi_i$ is indistinguishable from a KOSK proof by the definition of KOSK-Simulate.

Thus, $C_{know}$ wins the co-DCDH game just when $A_{know}$ wins, KOSK-Simulate outputs a convincing $\pi_i$ and KOSK-Extract outputs $sk_a$. KOSK-Simulate and KOSK-Extract succeed with overwhelming probability by definition, so $C_{know}$ wins the co-DCDH game with non-negligible probability. By Lemma 1 this contradicts the assumption that co-CDH is hard, so $A_{know}$ cannot win knowledge-forgery with non-negligible probability.

Theorem 2

In some examples, the BLS-SPoCK scheme is secure against key forgery in the random oracle model, under the co-CDH assumption in $(G_1, G_2)$.

Proof. To win the key-forgery game, A must forge a BLS-SPoCK proof $\sigma_o$ for a message $m_o$ such that, for some honestly-generated key pair (pk, sk), $\sigma_o$ verifies against $pk_c$, pk, and BSP-Prove(sk, $m_o$). By the uniqueness of BLS-SPoCK proofs, it must be the case that $\sigma_o=H(m_o)^{sk_c}$, which is the BLS signature message $m_o$ with respect to the key pair $(sk_c, pk_c)$. In other words, winning key-forgery requires forging a BLS signature on $m_o$. Boneh et al. prove security of BLS signatures against existential forgery for a chosen message (i.e., EUF-CMA security) in the random oracle model and under the co-CDH assumption for $(G_1, G_2)$, which proves the theorem.

Corollary 4

In some examples, the BLS-SPoCK scheme is unforgeable in the KOSK and may be a random oracle model under the co-CDH assumption in $(G_1, G_2)$.

FIGS. 4-7 depict example flow diagrams that describe various above described properties of the system and/or proof scheme. The flowcharts depict users, Alice, Bob and Eve, and verifier, Oscar. The users generate a proof (p_a, p_b, p_e) or with their respective private key (sk_a, sk_b, sk_e) and a shared message (m) (if they have access to it). The verifier employs the Verify function to verify the provided proofs. In some embodiments, the users and the verifier each employ a computing device, such as the computing devices 102, 104, 106, 108 depicted in FIGS. 1-2 and the computing device 1010 depicted in FIG. 10, to execute the respective Proof or Verify functions, such as described in detail above. For example, the users and verifiers may be operating as nodes in a system, such as the example decentralized computation system described above.

In some examples, the Verify function may correspond with transitivity (e.g., illustrated in FIG. 5). The transitivity definition states that if multiple proofs verify against a same reference proof $\sigma_i$, then not only these proofs should verify against each other (transitivity), but there exists a message m from which all these proofs (including the reference proof) could be generated. Additional information regarding the Verify function and its uses in authentication and verification is illustrated in FIGS. 4-7 (e.g., as "Verify ( )," etc.).

Figure 4:
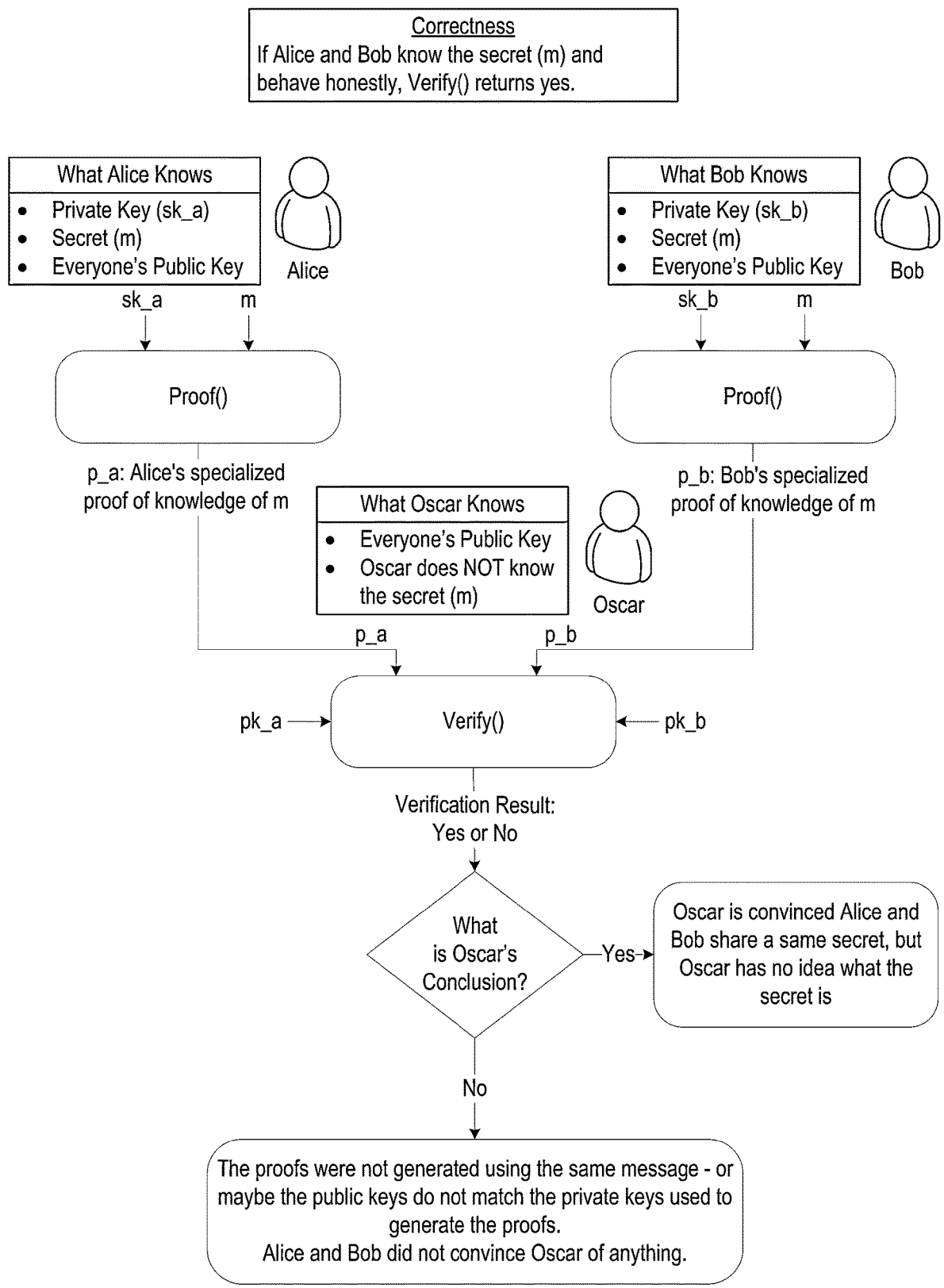
FIGS. 4-7 depict non-limiting exemplary flow diagrams that describe various properties of the scheme.

FIG. 4 depicts a flowchart that shows the correctness property of the scheme. As depicted, the prover users, Alice and Bob, have access to (know) their respective private key (sk_a, sk_b), secret data (m), and the other public keys in the system. Using the Proof function, the prover users each generate a specialized proof of knowledge (p_a, p_b) of the secret data (m) with their respective private key (sk_a, sk_b) and the secret data (m). The verifier, Oscar, has access to these generated specialized proofs (p_a, p_b) and the other public keys in the system. Oscar specifically does not have access to the secret data (m). Employing the Verify function with the provided specialized proofs (p_a, p_b) and the respective public keys (pk_a, pk_b) for each of the prover users, Oscar can determine, without acquiring knowledge of the contents of the secret data (m), whether the prover users share the same secret data (m). If the provided specialized proofs (p_a, p_b) are not verified via the Verify function (e.g., because the proofs were not generated using the same secret data or the public keys (pk_a, pk_b) do not match their respective private keys (p_a, p_b) that were employed to generate the specialized proofs), then the provided specialized proofs (p_a, p_b) did not convince Oscar of anything.

FIG. 5 depicts a flowchart that shows the strong transitivity property of the scheme. As depicted, the prover users, Alice and Bob_i (Bob_1-Bob_n), have access to (know) their respective private key (sk_a, sk_b1-sk_bn), secret data (m), and the other public keys in the system. Using the Proof function, the prover users each generate a specialized proof (p_a, p_b1-p_bn) of the secret data (m) with their respective private key (sk_a, sk_b1-sk_bn) and the secret data (m). The verifier, Oscar, has access to these generated specialized proofs (p_a, p_b1-p_bn) and the other public keys in the system. Oscar specifically does not have access to the secret data (m). Employing the Verify function with the provided specialized proofs (p_a, p-b1-p_bn) and the respective public keys (pk_a, pk_b1-pk_bn) for each of the prover users, Oscar can determine, without acquiring knowledge of the contents of the secret data (m), whether each of the prover users Bob_1-Bob_n share the same secret data (m) with the prover user Alice. If the provided specialized proofs (p_a, p_bi) are not verified via the Verify function, then the provided specialized proofs (p_a, p_bi) did not convince Oscar of anything regarding Alice and the particular Bob_i.

Figure 6:
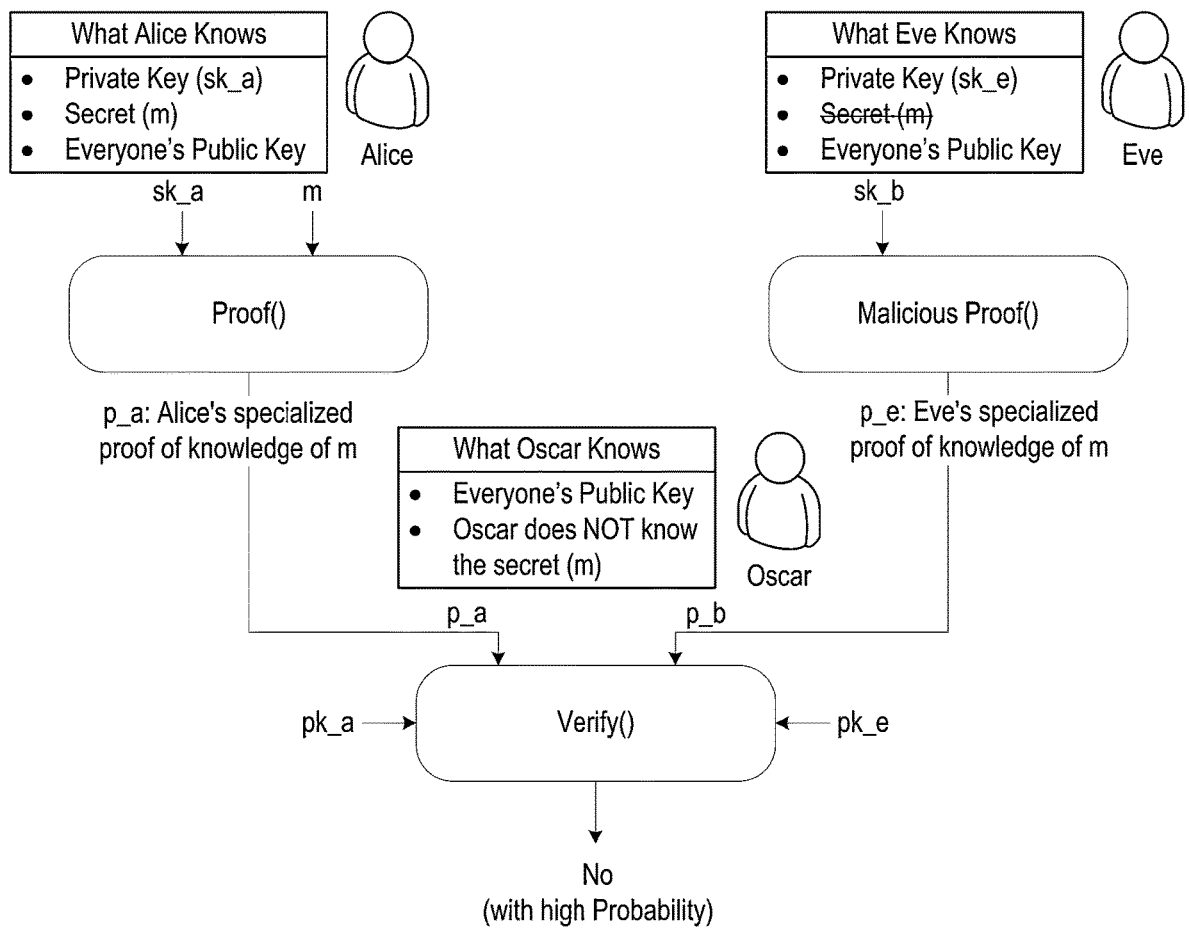

FIG. 6 depicts a flowchart that shows the knowledge unforgeability property of the scheme. As depicted, the prover users, Alice and Eve, have access to (know) their respective private key (sk_a, sk_e) and the other public keys in the system. However, only Alice has access to the secret data (m); Eve does not have access to the secret data (m). Using the Proof function, Alice generates a specialized proof, p_a, with her private key (sk_a) the secret data (m). Because Eve does not access to the secret data (m), she generates a proof, p_e, via a Malicious Proof function with her private key (p_e) (e.g., Eve is attempting to trick Oscar into believing that she has access to the secret data (m)). The verifier, Oscar, has access to these generated specialized proofs (p_a, p_e) and the other public keys in the system. Oscar specifically does not have access to the secret data (m). Employing the Verify function with the provided specialized proofs (p_a, p_e) and the respective public keys (pk_a, pk_e) for each of the prover users, Oscar can determine, without acquiring knowledge of the contents of the secret data (m), whether the prover users share the same secret data (m). In the depicted use case, the provided specialized proofs (p_a, p_e) do not convince Oscar that Alice and Eve have access to the same secret data (m).

Figure 7:
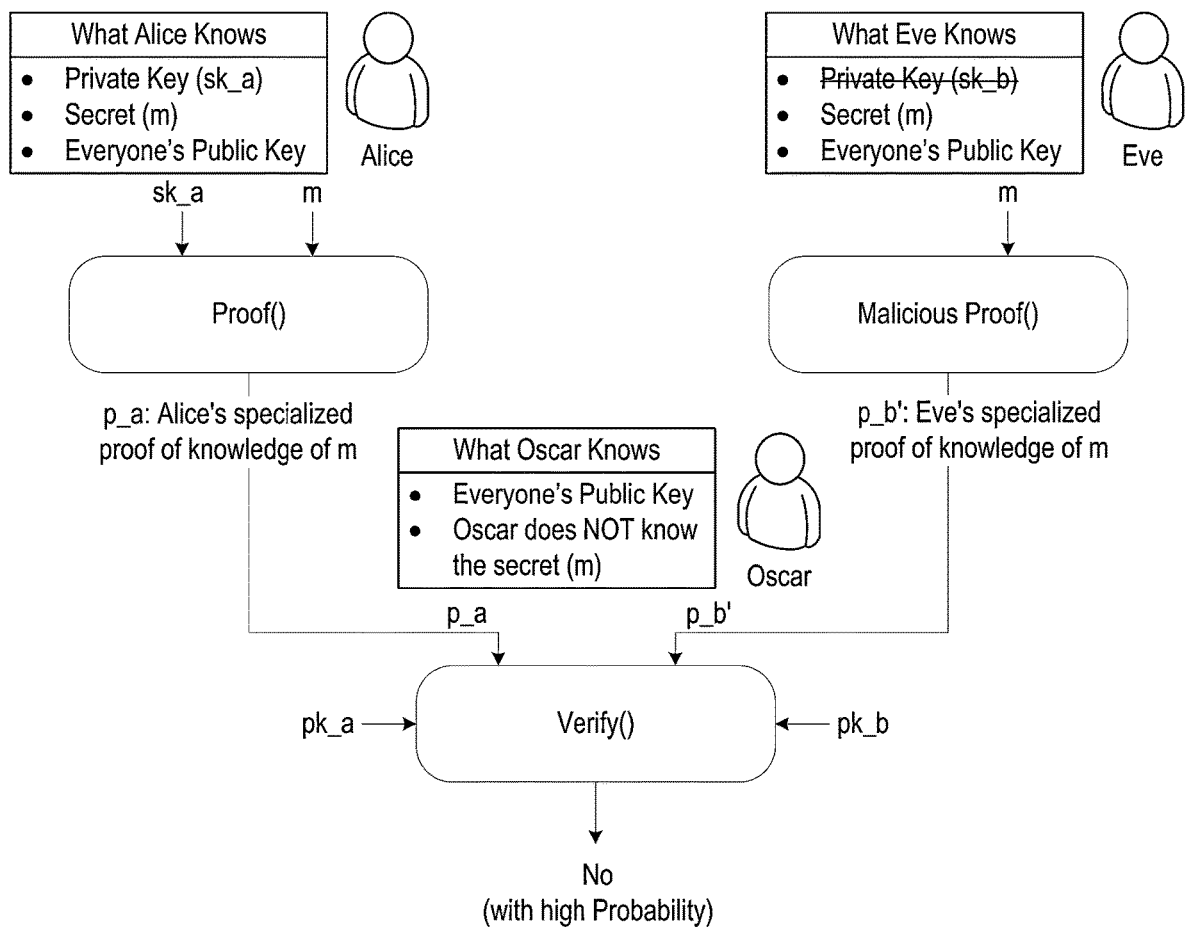

FIG. 7 depicts a flowchart that shows the key unforgeability property of the scheme. As depicted, the prover users, Alice and Eve, have access to (know) the secret data (m) and the other public keys in the system. However, Alice has access to her private key (sk_a); while Eve does not have access to Bob's private key (pk_b). Using the Proof function, Alice generates a specialized proof, p_a, with her private key (sk_a) the secret data (m). Because Eve does not access to Bob's private key, she generates the proof, p_b', via a Malicious Proof function with the secret data (m) (e.g., Eve is attempting to trick Oscar into believing that Bob has access to the secret data (m)). The verifier, Oscar, has access to these generated specialized proofs (p_a, p_b') and the other public keys in the system. Oscar specifically does not have access to the secret data (m). Employing the Verify function with the provided specialized proofs (p_a, p_b') and the public key associated Alice (pk_a) and the public key associated Bob (pk_b), Oscar can determine, without acquiring knowledge of the contents of the secret data (m), whether both Alice and Bob have access to the secret data (m). In the depicted use case, the provided specialized proofs (p_a, p_b') do not convince Oscar that Alice and Bob have access to the same secret data (m).

Figure 8:
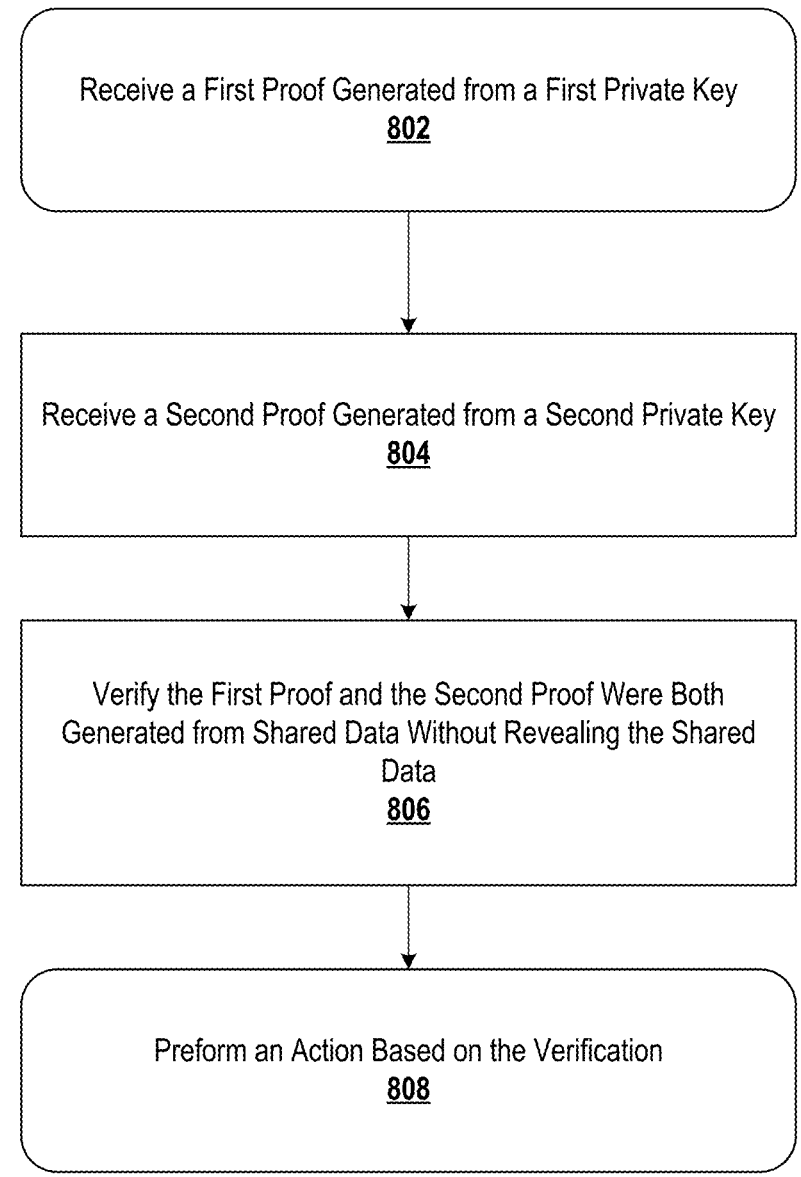
FIGS. 8-9 depict a non-limiting exemplary processes that can be implemented by embodiments of the systems described herein.

FIG. 8 depicts a flowchart of an example process 800 that can be implemented by the various nodes (e.g., as described in FIG. 3) in the example decentralized computation system. The process may show how the system uses the shared data to verify proofs without revealing the shared data. The process may be performed by any other suitable system, environment, software, and hardware, or a combination of systems, environments, software, and hardware as appropriate. In some embodiments, various operations of the processes can be run in parallel, in combination, in loops, or in any order.

At 802 a first proof is received from a first node; the first proof generated from a first private key associated with the first node and data shared between the first node and a second node. From 802, the process 800 proceeds to 804.

At 804, a second proof is received from the second node; the second proof generated from the shared data and a second private key associated with the second node. From 804, the process 800 proceeds to 806.

At 806, the first proof and the second proof are verified, without revealing the shared data, to have both been generated from the shared data. The proofs are verified using a first public key mathematically related to the first private key and a second public key mathematically related to the second private key. In some embodiments, the first proof is only attributable to the first node. In some embodiments, the second proof is only attributable to the second node. In some embodiments, the first proof or the second proof cannot be verified with only the respective public key. In some embodiments, the first proof and the second proof each comprise a signature of the shared data generated with the respective private key. In some embodiments, the signatures are based on a BLS signature scheme. In some embodiments, the verification of the first proof and the second proof comprises a pairing equality check based on the two signatures, the first public key, and the second public key. In some embodiments, verifying the first proof and the second proof comprises a pairing equality check. In some embodiments, the first proof and the second proof are generated and verified in a non-interactive protocol. From 806, the process 800 proceeds to 808.

At 808, an action is preformed based on the verification of the first proof and the second proof both being generated from the shared data. In some embodiments, the first proof and the second proof are publicly revealed by the first node and the second node respectively. In some embodiments, the action comprises revealing publicly the verification of the first proof and the second proof were both generated from the shared data. In some embodiments, the shared data comprises an execution trace proving an execution of at least one transaction of a block within a blockchain. In some embodiments, the first node comprises a verification node employed to guarantee correctness of a computation of an execution node. In some embodiments, the computation comprises the execution trace. In some embodiments, the second node comprises the execution node employed to execute the at least one transaction of the block. In some embodiments, the verification node publishes the first proof as proof that the computation has been verified. In some embodiments, the action comprises providing a state response to a client, the state response determined based on an output for the block. In some embodiments, the computation is broken up into chunks to allow a lighter computation verification in a parallel and independent manner. In some embodiments, the action comprises arbitrating that each of the chunks are consistently generated from the same intermediate results by the execution node and the verification node. From 808, the process 800 ends.

Figure 9:

FIG. 9 depicts a flowchart of an example process 900 that can be implemented by the various nodes (e.g., as described in FIG. 3) in the example decentralized computation system. The process may show how the system uses the shared data to verify proofs without revealing the shared data. The process may be performed by any other suitable system, environment, software, and hardware, or a combination of systems, environments, software, and hardware as appropriate. In some embodiments, various operations of the processes can be run in parallel, in combination, in loops, or in any order.

At 902 a proof is received from each of a plurality of nodes, each proof having been generated from data shared between the nodes and a respective private key associated with each node. In some embodiments, each of the proofs are publicly revealed by their respective nodes. In some embodiments, each of the proofs is only attributable to the respective generating node. In some embodiments, each of the proofs cannot be verified with only the respective public key. In some embodiments, the shared data comprises an execution trace proving an execution of at least one transaction of a block within a blockchain. From 902, the process 900 proceeds to 904.

At 904, each of the proofs is verified, without revealing the shared data, as having been generated from the shared data. The proofs are verified using a plurality of public keys each mathematically related to a respective one of the private keys. In some embodiments, proofs each comprise a signature of the shared data generated with the respective private key. In some embodiments, the verification of the proofs comprises a pairing equality check based on the signatures and the public keys. In some embodiments, the signatures are based on a BLS signature scheme. In some embodiments, verifying the proofs comprises a pairing equality check. In some embodiments, the proofs are generated and verified in a non-interactive protocol. In some embodiments, a number of verifications of the proofs is linear in the number of the nodes and not quadratic. In some embodiments, verifying the proofs requires one less verification than the number of nodes. From 904, the process 900 proceeds to 906.

At 906, an action is preformed based on the verification of the proofs being generated from the shared data. In some embodiments, the action comprises revealing publicly the verification of the first proof and the second proof were both generated from the shared data. From 906, the process 900 ends.

In some embodiments, the platforms, systems, media, and methods described herein include a computing devices, processors, or use of the same. In further embodiments, the computing device includes one or more hardware central processing units (CPUs) or general purpose graphics processing units (GPUs) that carry out the device's functions. In still further embodiments, the computing device further comprises an operating system configured to perform executable instructions. In some embodiments, the computing device is optionally connected a computer network. In further embodiments, the computing device is optionally connected to the Internet such that it accesses the World Wide Web. In still further embodiments, the computing device is optionally connected to a cloud computing infrastructure. In other embodiments, the computing device is optionally connected to an intranet. In other embodiments, the computing device is optionally connected to a data storage device.

In accordance with the description herein, suitable computing devices include, by way of non-limiting examples, cloud computing resources, server computers, server clusters, desktop computers, laptop computers, notebook computers, sub-notebook computers, netbook computers, netpad computers, handheld computers, mobile smartphones, and tablet computers. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the computing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 10:
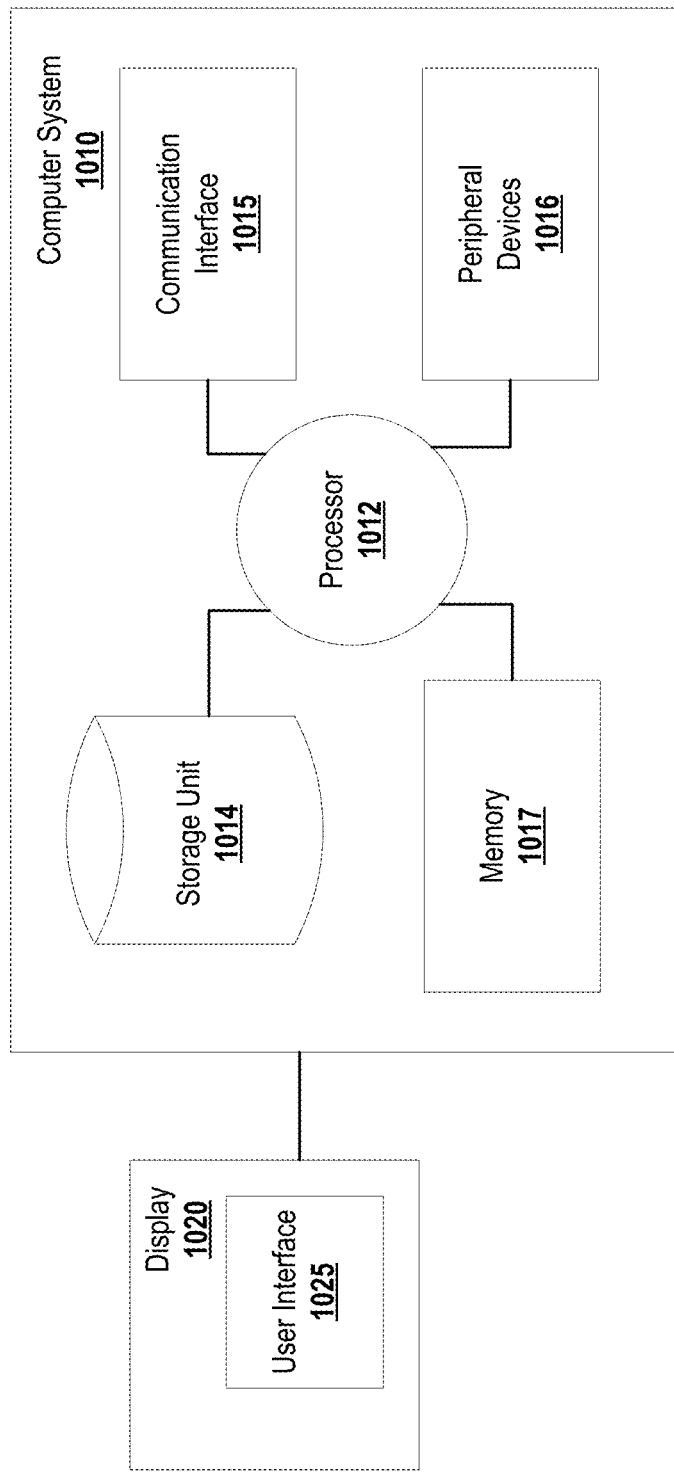
FIG. 10 depicts a non-limiting exemplary computer system that can be programmed or otherwise configured to implement methods or systems of the present disclosure.

Computer control systems are provided herein that can be used to implement the platforms, systems, media, and methods of the disclosure. FIG. 10, depicts an example computing device 1010 that can be programmed or otherwise configured to implement platforms, systems, media, and methods of the present disclosure. For example, the computing device 1010 can be programmed or otherwise configured such as the description regarding computing devices 102, 104, 106, 108 depicted in FIGS. 1-2.

In the depicted embodiment, the computing device 1010 includes a CPU (also "processor" and "computer processor" herein) 1012, which is optionally a single core, a multi core processor, or a plurality of processors for parallel processing. The computing device 1010 also includes memory or memory location 1017 (e.g., random-access memory, read-only memory, flash memory), electronic storage unit 1014 (e.g., hard disk), communication interface 1015 (e.g., a network adapter) for communicating with one or more other systems, and peripheral devices 1016, such as cache, other memory, data storage or electronic display adapters.

In some embodiments, the memory 1017, storage unit 1014, communication interface 1015, and peripheral devices 1016 are in communication with the CPU 1012 through a communication bus (solid lines), such as a motherboard. The storage unit 1014 comprises a data storage unit (or data repository) for storing data. The computing device 1010 is optionally operatively coupled to a computer network, such as the network 110 depicted in FIGS. 1-2, with the aid of the communication interface 1015. In some embodiments, the computing device 1010 is configured as a back-end server deployed within the described platform.

In some embodiments, the CPU 1012 can execute a sequence of machine-readable instructions, which can be embodied in a program or software. The instructions may be stored in a memory location, such as the memory 1017. The instructions can be directed to the CPU 1012, which can subsequently program or otherwise configure the CPU 1012 to implement methods of the present disclosure. Examples of operations performed by the CPU 1012 can include fetch, decode, execute, and write back. In some embodiments, the CPU 1012 is part of a circuit, such as an integrated circuit. One or more other components of the computing device 1010 can be optionally included in the circuit. In some embodiments, the circuit is an application specific integrated circuit (ASIC) or a field programmable gate array (FPGA).

In some embodiments, the storage unit 1014 can store files, such as drivers, libraries and saved programs. In some embodiments, the storage unit 1014 stores data, such as detection logic; analysis of various threats that have been encountered by an enterprise; metadata regarding triage performed to mitigate threats, false positives, and performance metrics, and so forth. In some embodiments, the computing device 1010 includes one or more additional data storage units that are external, such as located on a remote server that is in communication through an intranet or the Internet.

In some embodiments, the computing device 1010 communicates with one or more remote computer systems through a network. For instance, the computing device 1010 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants, such as depicted in FIGS. 1-2. In some embodiments, a user can access the computing device 1010 via a network, such as depicted in FIGS. 1-2.

In some embodiments, the platforms, systems, media, and methods as described herein are implemented by way of machine (e.g., computer processor) executable code stored on an electronic storage location of the computing device 1010, such as, for example, on the memory 1017 or the electronic storage unit 1014. In some embodiments, the CPU 1012 is adapted to execute the code. In some embodiments, the machine executable or machine-readable code is provided in the form of software. In some embodiments, during use, the code is executed by the CPU 1012. In some embodiments, the code is retrieved from the storage unit 1014 and stored on the memory 1017 for ready access by the CPU 1012. In some situations, the electronic storage unit 1014 is precluded, and machine-executable instructions are stored on the memory 1017. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 1010 can include or be in communication with an electronic display 1035. In some embodiments, the electronic display 1035 provides a user interface (UI) 1040.

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

In some embodiments, the platforms, systems, media, and methods disclosed herein include at least one computer program, or use of the same. A computer program includes a sequence of instructions, executable in the computing device's CPU, written to perform one or more specified tasks. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the platforms, systems, media, and methods disclosed herein include one or more databases, or use of the same. In view of the disclosure provided herein, those of skill in the art will recognize that many databases are suitable for storage and retrieval of data records. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, MongoDB, Oracle, DB2, and Sybase. In some embodiments, a database is web-based. In still further embodiments, a database is cloud computing-based. In other embodiments, a database is based on one or more local computer storage devices.

What is claimed is:

1. A method comprising:
   accessing, by one or more processors, a first proof generated based on data shared between a first device and a second device and based on a first private key that corresponds to the first device, the first and second d$^e$-vices being peer-to-peer nodes of a blockchain network;
   accessing, by the one or more processors, a second proof generated based on the shared data and based on a second private key that corresponds to the second device;
   verifying, by the one or more processors and based on a first public key that corresponds to the first private key and based on a second public key that corresponds to the second private key, that the first proof and the second proof were generated based on the shared data;
   computing, by the one or more processors, an execution trace that proves execution of a transaction indicated by a block within a blockchain maintained by the blockchain network, the computing being performed in chunks; and
   verifying, by the one or more processors without revealing the shared data and based on the verifying that the first proof and the second proof were generated based on the shared data, that at least one chunk among the chunks of the computing of the execution trace is computed based on the data shared between the first device and the second device.

2. The method of claim 1, wherein the first proof is revealed by the first device, and the second proof is revealed by the second device.

3. The method of claim 1, wherein the first proof is only attributable to the first device, and the second proof is only attributable to the second device.

4. The method of claim 1, wherein the first proof cannot be verified with only the first public key, and the second proof cannot be verified with only the second public key.

5. The method of claim 1 wherein the first proof includes a first signature generated from the shared data based on the first private key, and the second proof includes a second signature generated from the shared data based on the second private key.

6. The method of claim 5, wherein the verifying that the first proof and the second proof were generated based on the shared data includes performing a pairing equality check based on the first signature, the second signature, the first public key, and the second public key.

7. The method of claim 1, wherein the verifying that the first proof and the second proof were generated based on the shared data includes performing a pairing equality check.

8. A system comprising:
   one or more processors; and
   computer-readable medium storing instructions that, when executed by the one or more processors, cause the one or more processors to perform operations comprising:
   accessing a first proof generated based on data shared between a first device and a second device and based on a first private key that corresponds to the first device, the first and second devices being peer-to-peer nodes of a blockchain network;
   accessing a second proof generated based on the shared data and based on a second private key that corresponds to the second device;
   verifying, based on a first public key that corresponds to the first private key and based on a second public key that corresponds to the second private key, that the first proof and the second proof were generated based on the shared data;
   computing an execution trace that proves execution of a transaction indicated by a block within a blockchain maintained by the blockchain network, the computing being performed in chunks; and
   verifying, without revealing the shared data and based on the verifying that the first proof and the second proof were generated based on the shared data, that at least one chunk among the chunks of the computing of the execution trace is computed based on the data shared between the first device and the second device.

9. The system of claim 8, wherein the first proof is revealed by the first device, and the second proof is revealed by the second device.

10. The system of claim 8, wherein the first proof is only attributable to the first device, and the second proof is only attributable to the second device.

11. The system of claim 8, wherein the first proof cannot be verified with only the first public key, and the second proof cannot be verified with only the second public key.

12. The system of claim 8, wherein the first proof includes a first signature generated from the shared data based on the first private key, and the second proof includes a second signature generated from the shared data based on the second private key.

13. The system of claim 12, wherein the verifying that the first proof and the second proof were generated based on the shared data includes performing a pairing equality check based on the first signature, the second signature, the first public key, and the second public key.

14. The system of claim 8, wherein the verifying that the first proof and the second proof were generated based on the shared data includes performing a pairing equality check.

15. A non-transitory computer-readable medium comprising instructions that, when executed by one or more processors, cause the one or more processors to perform operations comprising:
- accessing a first proof generated based on data shared between a first device and a second device and based on a first private key that corresponds to the first device, the first and second devices being peer-to-peer nodes of a blockchain network;
- accessing a second proof generated based on the shared data and based on a second private key that corresponds to the second device;
- verifying, based on a first public key that corresponds to the first private key and based on a second public key that corresponds to the second private key, that the first proof and the second proof were generated based on the shared data; and
- computing an execution trace that proves execution of a transaction indicated by a block within a blockchain maintained by the blockchain network, the computing being performed in chunks; and
- verifying, without revealing the shared data and based on the verifying that the first proof and the second proof were generated based on the shared data, that at least one chunk among the chunks of the computing of the execution trace is computed based on the data shared between the first device and the second device.

16. The non-transitory computer-readable medium of claim 15, wherein the first proof is revealed by the first device, and the second proof is revealed by the second device.

17. The non-transitory computer-readable medium of claim 15, wherein the first proof is only attributable to the first device, and the second proof is only attributable to the second device.

18. The non-transitory computer-readable medium of claim 15, wherein the first proof cannot be verified with only the first public key, and the second proof cannot be verified with only the second public key.

19. The non-transitory computer-readable medium of claim 15, wherein the first proof includes a first signature generated from the shared data based on the first private key, and the second proof includes a second signature generated from the shared data based on the second private key.

20. The non-transitory computer-readable medium of claim 15, wherein the verifying that the first proof and the second proof were generated based on the shared data includes performing a pairing equality check.

* * * * *

UNITED STATES PATENT AND TRADEMARK OFFICE
CERTIFICATE OF CORRECTION

PATENT NO. : 11,824,990 B2
APPLICATION NO. : 17/745874
DATED : November 21, 2023
INVENTOR(S) : Tarek Ben Youssef It is certified that error appears in the above-identified patent and that said Letters Patent is hereby corrected as shown below:

In the Specification

In Column 14, Line 51, delete "122-128" and insert --222-228-- therefor

In Column 15, Line 48, delete "222-226" and insert --222-228-- therefor

In Column 20, Line 60, delete "345" and insert --335-- therefor

In Column 21, Line 17, delete "305" and insert --315-- therefor

In Column 26, Lines 24-25, delete "Aco-DCDH" and insert --$A_{co}$-DCDH-- therefor In Column 27, Line 9, after "proof", insert --.--

In Column 27, Line 11, delete "it" and insert --π-- therefor

In Column 29, Line 12, delete "σ←SP-Prove(sk$_i$,m)," and insert --$\sigma_i \leftarrow SP - Prove(sk_i, m)$,-- therefor In Column 29, Line 31, delete "α$_i$←SP-" and insert --$\sigma_i \leftarrow SP -$ -- therefor In Column 29, Line 63, delete "σ$_b$," and insert --σ$_b$-- therefor In Column 30, Lines 66-67, delete "  " and insert Signed and Sealed this
Thirty-first Day of December, 2024

Derrick Brent
*Acting Director of the United States Patent and Trademark Office*

CERTIFICATE OF CORRECTION (continued)
U.S. Pat. No. 11,824,990 B2

-- $e(\text{BSP-Prove}(sk_a,m),pk_b)=e(H(m)^{sk_a}, g_2^{sk_b})=e(H(m),g_2)^{sk_a \cdot sk_b}=e(H(m)^{sk_b},g_2^{sk_a})$ -- therefor In Column 31, Line 13, delete "$\sigma_1^{sk_1^{-1}} = \sigma_i^{sk_n^{-1}}$" and insert -- $\sigma_1^{sk_1^{-1}} = \sigma_i^{sk_i^{-1}}$ -- therefor In Column 31, Line 55, delete "∃i:" and insert --∄i:-- therefor In Column 39, Line 3, delete "1035." and insert --1020.-- therefor In Column 39, Line 3, delete "1035" and insert --1020-- therefor In Column 39, Line 4, delete "1040." and insert --1025.-- therefor In Column 40, Line 13, delete "Java™" and insert --Java™,-- therefor In the Claims In Column 41, Line 47, in Claim 1, delete "d$^e$-vices" and insert --devices-- therefor In Column 42, Line 12, in Claim 5, after "claim 1", insert --,--